US006783289B2

(12) United States Patent
Tagawa

(10) Patent No.: US 6,783,289 B2
(45) Date of Patent: Aug. 31, 2004

(54) PRINT CONTROL APPARATUS, PRINT CONTROL METHOD, AND PRINTER

(75) Inventor: Norio Tagawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/458,197

(22) Filed: Jun. 11, 2003

(65) Prior Publication Data

US 2003/0231916 A1 Dec. 18, 2003

(30) Foreign Application Priority Data

Jun. 13, 2002 (JP) ........................................ 2002-172487

(51) Int. Cl.$^7$ ............................ B41J 5/30; G06F 15/00; G06K 15/00; G02B 26/00
(52) U.S. Cl. ........................ 400/61; 358/296; 358/1.15; 358/1.1; 358/1.18; 358/1.2
(58) Field of Search ............................ 400/61; 358/296, 358/1.15, 1.1, 1.18, 1.2; 715/525; 345/764, 767

(56) References Cited

U.S. PATENT DOCUMENTS

| 5,884,014 | A | * | 3/1999 | Huttenlocher et al. ...... 358/1.15 |
| 5,963,205 | A | * | 10/1999 | Sotomayor ................... 715/531 |
| 6,038,573 | A | * | 3/2000 | Parks .......................... 715/513 |
| 6,407,821 | B1 | * | 6/2002 | Hohensee et al. .......... 358/1.15 |
| 6,446,099 | B1 | * | 9/2002 | Peairs ........................... 715/517 |
| 6,473,847 | B1 | * | 10/2002 | Kamiya ....................... 711/171 |
| 6,476,923 | B1 | * | 11/2002 | Cornell ....................... 358/1.12 |
| 6,480,866 | B2 | * | 11/2002 | Mastie ......................... 715/525 |
| 6,487,567 | B1 | * | 11/2002 | Michelman et al. ......... 715/525 |
| 6,507,410 | B1 | * | 1/2003 | Robertson et al. .......... 358/1.18 |
| 6,532,492 | B1 | * | 3/2003 | Presler-Marshall .......... 709/223 |
| 6,538,760 | B1 | * | 3/2003 | deBry et al. ................ 358/1.15 |
| 6,596,031 | B1 | * | 7/2003 | Parks ........................... 715/513 |
| 2001/0015812 | A1 | * | 8/2001 | Sugaya ......................... 358/1.1 |
| 2002/0002569 | A1 | * | 1/2002 | Nguyen et al. .............. 707/515 |
| 2003/0023754 | A1 | * | 1/2003 | Eichstadt et al. ............ 709/246 |
| 2003/0037076 | A1 | * | 2/2003 | Bravery et al. .............. 707/517 |

FOREIGN PATENT DOCUMENTS

| EP | 001047001 A1 | * 10/2000 | ........... G05F/17/21 |
| JP | 7-323636 | 12/1995 | |
| JP | 2002-63013 | 2/2002 | |

* cited by examiner

*Primary Examiner*—Andrew H. Hirshfeld
*Assistant Examiner*—Wasseem H. Hamdan
(74) *Attorney, Agent, or Firm*—Oliff & Berridge, PLC

(57) ABSTRACT

A print control apparatus including a disposing unit for disposing, on pages, document data described in a page description language; a detecting unit for detecting a page break allowable position in the document data on the basis of page break inhibition information related to the document data; a first storage unit for storing the page break allowable position detected by the detecting unit; a second storage unit for storing a disposition range in each page for the document data to be disposed by the disposing unit; and a determining unit for determining a page break position in the document data on the basis of the page break allowable position stored in the first storage unit and the disposition range in each page stored in the second storage unit, such that part of the document data to be disposed in each page does not overflow the page.

11 Claims, 20 Drawing Sheets

```
HTML FILE
  <p>
    text1
  </p>
  <div>
  <p>
    text2
  <p>
  </div>
```

INTERFACE DATA

BLOCK START

| p | page-break | OTHERS |

TEXT

| text1 |

BLOCK END

| p | page-break |

⎤ BD1

BLOCK START

| div | page-break | OTHERS |

BLOCK START

| p | page-break | OTHERS |

TEXT

| text2 |

BLOCK END

| p | page-break |

⎤ BD3

BLOCK END

| div | page-break |

⎤ BD2

BR1 — text1
BR2
BR3 — text2

PRINT CONTROL APPARATUS, PRINT CONTROL METHOD, AND PRINTER

BACKGROUND OF THE INVENTION

1. Field of the Invention

The present invention relates to determination of a page break position in document data being printed.

2. Description of Related Art

A web page is described using HTML (Hyper Text Markup Language). HTML includes therein a large number of specifications concerning visual layout in a web page. However, HTML is originally for describing the logical structure of a document. Describing the layout in a web page using HTML may make the logical structure of the document hard to understand. For this reason, CSS (Cascading Style Sheet) is devised as a means for describing the layout in a web page. By use of CSS, information on page layout, such as font, character size, character decoration, and line spacing, can be separated from each HTML document including the logical structure of the document. This makes it easy to construct a page layout and can realize a variety of expressions in a web page.

HTML includes no specification concerning page break. Therefore, a web page described only using HTML can not be printed with inserting a page break at an arbitrary position. On the other hand, CSS defines three commands for inhibiting a page break, that is, BA (Before Avoid) for inhibiting a page break before a document, IA (Inside Avoid) for inhibiting a page break inside the document, and AA (After Avoid) for inhibiting a page break after the document.

SUMMARY OF THE INVENTION

According to an aspect of the present invention, a print control apparatus comprises a disposing unit for disposing, on pages, document data described in a page description language; a detecting unit for detecting a page break allowable position in the document data on the basis of page break inhibition information related to the document data; a first storage unit for storing the page break allowable position detected by the detecting unit; a second storage unit for storing a disposition range in each page for the document data to be disposed by the disposing unit; and a determining unit for determining a page break position in the document data on the basis of the page break allowable position stored in the first storage unit and the disposition range in each page stored in the second storage unit, such that part of the document data to be disposed in each page does not overflow the page.

According to another aspect of the present invention, a print control method comprises the steps of disposing, on pages, document data described in a page description language; detecting a page break allowable position in the document data on the basis of page break inhibition information related to the document data; storing the page break allowable position detected in the step of detecting the page break allowable position; and determining a page break position in the document data on the basis of the page break allowable position stored in the step of storing the page break allowable position and a disposition range in each page for the document data to be disposed in the step of disposing the document data, such that part of the document data to be disposed in each page does not overflow the page.

According to still another aspect of the present invention, a computer program product comprises a disposing program for disposing, on pages, document data described in a page description language; a detecting program for detecting a page break allowable position in the document data on the basis of page break inhibition information related to the document data; a storing program for storing, in a memory, the page break allowable position detected by the detecting program; and a determining program for determining a page break position in the document data on the basis of the page break allowable position stored in the memory by the storing program and a disposition range in each page for the document data, such that part of the document data to be disposed in each page does not overflow the page.

According to still another aspect of the present invention, a printer comprises a disposing unit for disposing, on pages, document data described in a page description language; a detecting unit for detecting a page break allowable position in the document data on the basis of page break inhibition information related to the document data; a first storage unit for storing the page break allowable position detected by the detecting unit; a second storage unit for storing a disposition range in each page for the document data to be disposed by the disposing unit; a determining unit for determining a page break position in the document data on the basis of the page break allowable position stored in the first storage unit and the disposition range in each page stored in the second storage unit, such that part of the document data to be disposed in each page does not overflow the page; and a printing unit for printing with inserting a page break in the document data on the basis of the page break position determined by the determining unit.

According to the invention, page break processing for document data to be printed can be properly performed using page break inhibition information related to the document data. In the invention, "document data" means data including therein text data or image data, or data not including therein text data or image data but describing therein information for linking to the text data or image data and including therein an HTML file and interface data as will be described later.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

Figure 1:
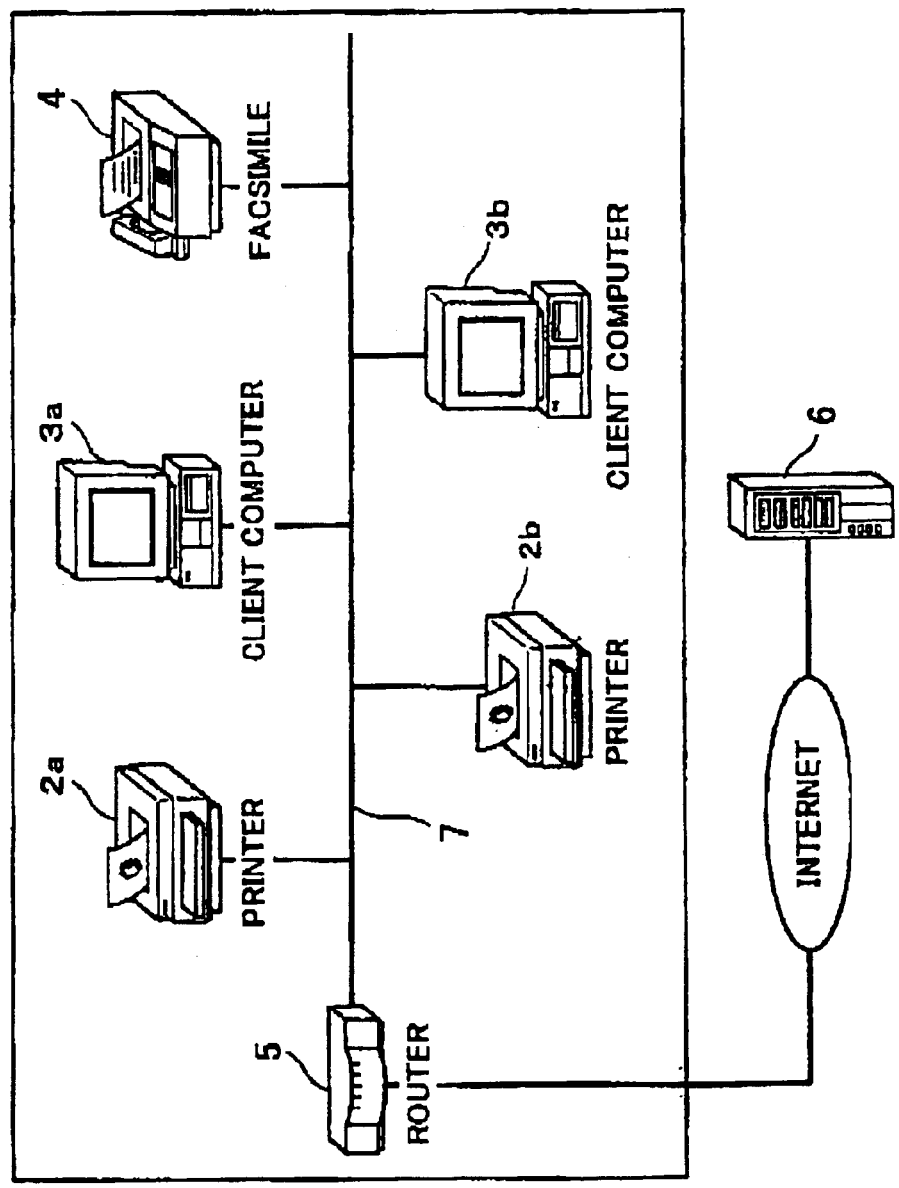
FIG. 1 illustrates a network system including printers each including therein a print control apparatus according to a first embodiment of the present invention.

FIG. 1 illustrates a network system including printers each including therein a print control apparatus according to a first embodiment of the present invention. The network system of FIG. 1 includes two printers 2a and 2b, two client computers 3a and 3b, a facsimile 4, and a router 5. These machines are connected to each other through a LAN cable 7 to form a LAN (Local Area Network). Each machine on the LAN can transmit data to and receive data from a web server 6 in the Internet through the router 5.

Figure 2:
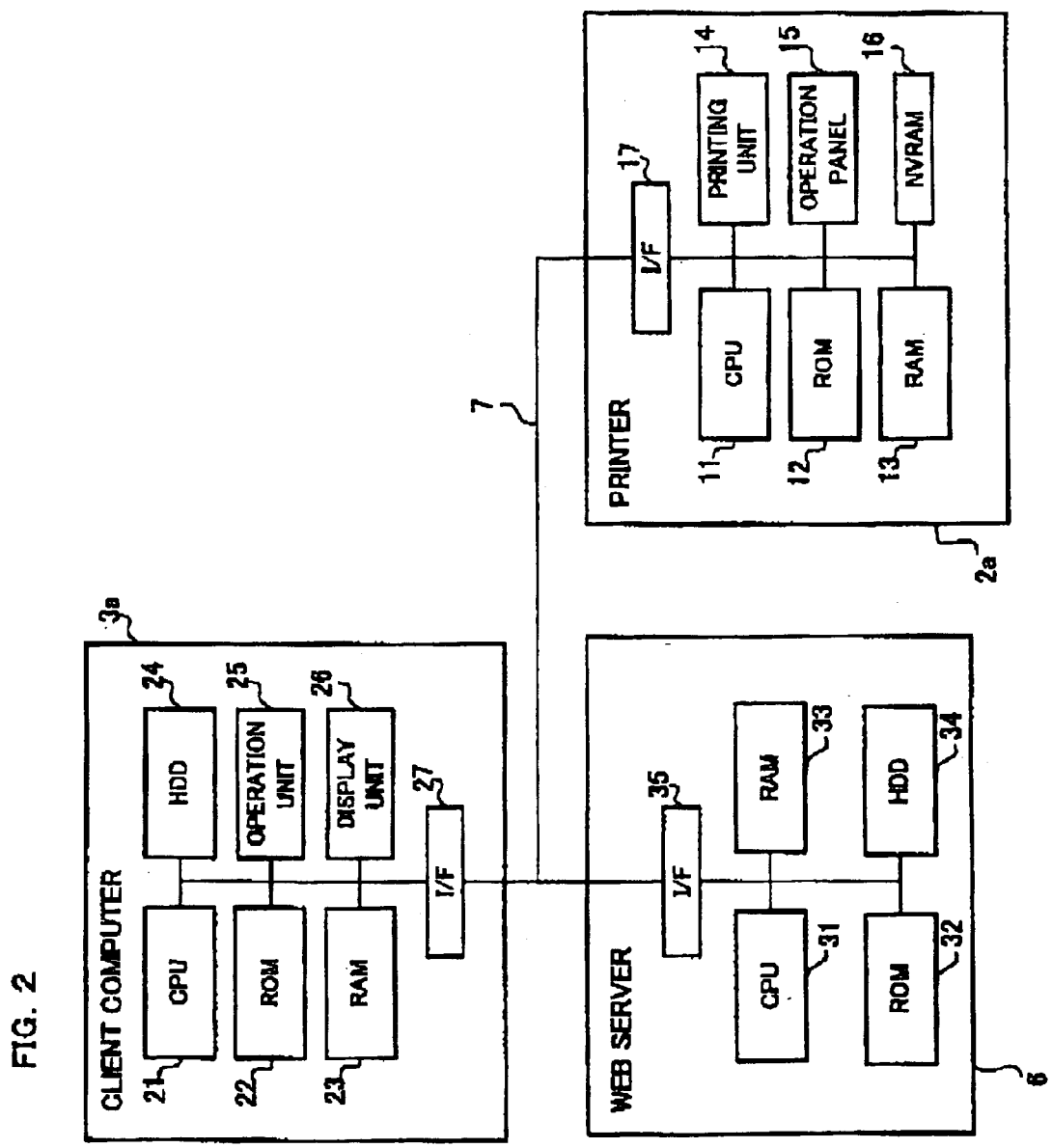
FIG. 2 is a block diagram of a client computer, a printer, and a server included in the system of FIG. 1.

Referring to FIG. 2, the web server 6 includes therein a CPU (Central Processing Unit) 31, a ROM (Read Only Memory) 32, a RAM (Random Access Memory) 33, a HDD (Hard Disk Drive) 34, and an Ethernet interface 35.

The CPU 31 performs various operations and processes. The ROM 32 works as part of the main memory of the web server 6. The ROM 32 stores therein various programs such as a system program. The RAM 33 works as part of the main memory of the web server 6, like the ROM 32. The RAM 33 has a working area for storing temporarily necessary working data, an intermediate file, and so on. The Ethernet interface 35 connects the web server 6 to the Internet and thereby enables the web server 6 to communicate with each machine, such as a printer 2a, connected to the Internet.

The HDD 34 stores therein an operating system and various application software programs. The HDD 34 further stores therein web page data and CSS files to be transmitted to a client on the Internet in response to a request from the client. The web page data includes an HTML file described in HTML.

Figure 3:
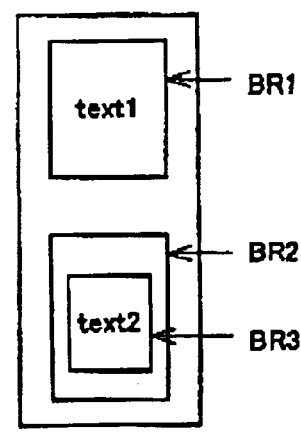
FIG. 3A illustrates an example of HTML file.
FIG. 3B illustrates interface data corresponding to the HTML file of FIG. 3A.
FIG. 3C illustrates an example of data disposition corresponding to the HTML file of FIG. 3A.

FIG. 3A illustrates an example of an HTML file. In this HTML file, each portion sandwiched by <p> and </p> corresponds to one block, i.e., one paragraph. That is, each of "text 1" and "text 2" is displayed and printed as one block. Each of "text 1" and "text 2" is a letter string in one logical line in which letters are arranged in a horizontal direction in each line and which include no line feed tag in the middle. Tag <div> has no specific meaning. It is used for right or left justify of the portion sandwiched by <div> and </div>. FIG. 3C illustrates an example of data disposition corresponding to the HTML file of FIG. 3A. In FIG. 3C, each of references BR1, BR2, and BR3 denotes a block. In this example, the block BR2 is a parent block, i.e., an upper level block, of the block BR3. The relation between the blocks BR2 and BR3 is called a hierarchical disposition. Blocks may be hierarchically disposed in three or more levels.

Although not illustrated in FIG. 3A, the HTML file stored in the HDD 34 includes an HTML code for designating a CSS file. Thus, the CSS file is downloaded together with the HTML file to the machine having issued the request.

In this embodiment, the CSS file includes therein a command "page-break" concerning page break. As the command "page-break", there are three kinds of commands, that is, "page-break-before", "page-break-after", and "page-break-inside". The command "page-break-before" is used for inhibiting a page break immediately before the block related to the command, or always inserting a page break immediately before the block related to the command. The command "page-break-after" is used for inhibiting a page break immediately after the block related to the command, or always inserting a page break immediately after the block related to the command. The command "page-break-inside" is used for inhibiting a page break inside the block related to the command, or inserting a page break inside the block related to the command.

These three commands are used in combination with one of modes "AUTO", "AVOID", and "ALWAYS". Thus, in the CSS file, as a command concerning page break, "page-break-before: AUTO", "page-break-before: AVOID", "page-break-before: ALWAYS", "page-break-after: AUTO", "page-break-after: AVOID", "page-break-after: ALWAYS", "page-break-inside: AUTO", "page-break-inside: AVOID", or the like, is properly described as a user desired. The mode "AUTO" is used when determination about a page break is not fixed at the position related to the command. Thus, when the made of a command is "AUTO", a page break can be carried out at any position related to the command. The mode "AVOID" is used for inhibiting a page break at the position related to the command. The mode "ALWAYS" is used for always inserting a page break at the position related to the command. The present invention does not directly relate to the mode "ALWAYS". Therefore, the mode "ALWAYS" will not be discussed below.

For example, the command "page-break-before: AVOID" is a command for inhibiting a page break before the corresponding block (Before Avoid: BA). The command "page-break-inside: AVOID" is a command for inhibiting a page break inside the corresponding block (Inside Avoid: IA). The command "page-break-after: AVOID" is a command for inhibiting a page break after the corresponding block (After Avoid: AA).

Each command "page-break-inside" succeeds as it is from an upper level block to a lower level block. For example, in FIG. 3C, when a command "page-break-inside: AVOID" is set for the upper level block BR2, the same command "page-break-inside: AVOID" is automatically applied also to the lower level block BR3. This succession is effective only in case of the commands "page-break-inside". The commands "page-break-before" and "page-break-after" do not succeed to any lower level block.

Referring back to FIG. 2, a client computer 3a includes therein a CPU 21, a ROM 22, a RAM 23, a HDD 24, an operation unit 25, a display unit 26, and an Ethernet interface 27. Because another client computer 3b has the same construction as the client computer 3a, the description of the client computer 3b is omitted here.

The CPU 21 performs various operations and processes. The ROM 22 works as part of the main memory of the client computer 3a. The ROM 22 stores therein various programs including a system program. The RAM 23 works as part of the main memory of the client computer 3a, like the ROM 22. The RAM 23, stores therein various data such as an HTML file and a CSS file transmitted from the web server 6. The Ethernet interface 27 connects the client computer 3a to the LAN and thereby enables the client computer 3a to communicate with each machine, such as a printer 2a, connected to the LAN.

The operation unit 25 is used for a user inputting data. The operation unit 25 includes a keyboard in which a predetermined number of input keys are arranged, and a pointing device such as a mouse. By operating the operation unit 25, the user inputs the lengths of upper, lower, left, and right margins in a paper. The input lengths of the upper, lower, left, and right margins are stored in the HDD 24. These lengths of the upper, lower, left, and right margins define a print range, i.e., a disposition range. The display unit 26 is a display device for displaying information. The display unit 26 may include a liquid crystal display or a plasma display for example.

The HDD 24 stores therein an operating system and various application software programs including a web browser. On the basis of data input through the operation unit 25, the web browser requests the web server 6 to transmit data such as an HTML file and a CSS file. On the basis of the data received from the web server 6, the web browser displays text data and/or image data on the display unit 26. At this time, the display unit 26 displays thereon the text data and/or the image data in accordance with a layout designated by the CSS file. The web browser has a printing function. The web browser sends the HTML file and the CSS file to one selected out of the printers 2a and 2b. The printer converts the received HTML and CSS files into interface data to perform processing. This conversion process is well known as executed by an existing web browser and thus the detailed description thereof is omitted here.

By way of example, FIG. 3B illustrates interface data corresponding to FIG. 3A. In this example, the interface data is obtained by converting quite the same information as information contained in the original HTML and CSS files into a form convenient for internal processing, and it is in a form wherein the CSS file is incorporated in the HTML file. That is, a command "page-break" concerning page break in CSS as described above is related to each tag such as <p> or <div>. More specifically, data in the interface data concerning block start may include therein a command "page-break-before" or "page-break-inside". Date in the interface data concerning block end may include therein a command "page-break-after".

Data BD1, BD2, and BD3 in the interface data of FIG. 3B correspond to the blocks BR1, BR2, and BR3 of FIG. 3c, respectively.

The HTML and CSS files to be transmitted from the client computer 3a to the printer can include therein data concerning disposition range, i.e., data concerning the lengths of the upper, lower, left, and right margins in each paper. If the files contain no such information, the printer uses, as the data concerning disposition range, the default values having been set therein.

Referring back to FIG. 2, the printer 2a includes therein a CPU 11, a ROM 12, a RAM 13, a printing unit 14, an operation panel 15, a NVRAM (Non-Volatile Random Access Memory) 16, and an Ethernet interface 17. Because another printer 2b has the same construction as the printer 2a, the description of the printer 2b is omitted here. Although the detailed description is omitted, the facsimile 4 includes therein a printing unit, like the printers 2a and 2b.

The ROM 12 works as part of the main memory of the printer is 2a. The ROM 12 stores therein various programs such including a system program. The RAM 13 works as part of the main memory of the printer 2a, like the ROM 12. In the RAM 13 defined are memory areas such as a working area, an area for storing a pointer indicating the position being currently processed upon printing, a page break allowable position pointer "pp", and the last page break information "last-pb", and an area for storing the mode of a command "page-break-inside" included in data concerning block start of an upper level block when blocks are hierarchically disposed. The RAM 13 stores therein interface data received from the client computer 3a, as web page data.

The page break allowable position pointer "pp" indicates the position of a page break allowable line in an HTML document being printed in accordance with interface data. When the interface data is processed in order from its head, the page break allowable position pointer "pp" always indicates the position of one page break allowable line last detected. The page break information "last-pb" indicates in which mode of "AUTO" and "AVOID" the last processed command "page-break" was, when the interface data is processed in order from its head.

The printing unit 14 provides a printing function for text data and/or image data in monochrome or color. The printing unit 14 prints, on a print medium, text data and/or image data included in interface data having been transmitted from the client computer 3a.

The operation panel 15 includes a display device for displaying thereon information and an input device for receiving an input operation from the external. The display device displays thereon various kinds of information on operation of the printer 2a.

The NVRAM 16 stores therein serial number data of the printer 2a, a program concerning page break position processing, a program concerning layout processing, a program concerning rendering processing, etc.

The Ethernet interface 17 connects the printer 2a to the LAN and thereby enables the printer 2a to communicate with each machine, such as a client computer 3a, connected to the LAN.

The CPU 11 performs various operations and processes. The CPU 11 progresses a print process in the printing unit 14 such that text data and/or image data included in interface data is printed with inserting a page break at a proper position. An outline of the print process will be described.

The CPU 11 disposes text data and/or image data included in interface data having been transmitted from the client computer 3a and being stored in the RAM 13, in order from the head of the interface data, within a rectangular disposition range defined in each paper. The positions of the left, right, upper, and lower ends of the disposition range is specified by data concerning disposition range being stored in the RAM 13.

In the course of disposing the text data and/or image data included in the interface data, within the disposition range, the CPU 11 updates the page break information "last-pb" as occasion demands on the basis of the interface data. Further, the CPU 11 searches for a page break allowable position in order from the head of the interface data, on the basis of the page break information "last-pb", a command "page-break" included in the interface data, and the like. When a page break allowable position is detected, the CPU 11 writes the detected page break allowable position into the page break allowable position pointer "pp" in the RAM 13. At every time when a new page break allowable position is detected, the CPU 11 updates the page break allowable position being indicated by the page break allowable position pointer "pp", into the newly detected page break allowable position.

Referring to the page break allowable position pointer "pp", the CPU 11 inserts a page break in the text data and/or image data such that any part of the text data and/or image data is not disposed in the lower margin of a page because of overflowing data. That is, the CPU 11 disposes the part of the text data and/or image data in excess of the disposition range of the page and to be disposed in the lower margin of the page, within the disposition range of the next page in order from the upper left of the disposition range of the next page.

Figure 4:
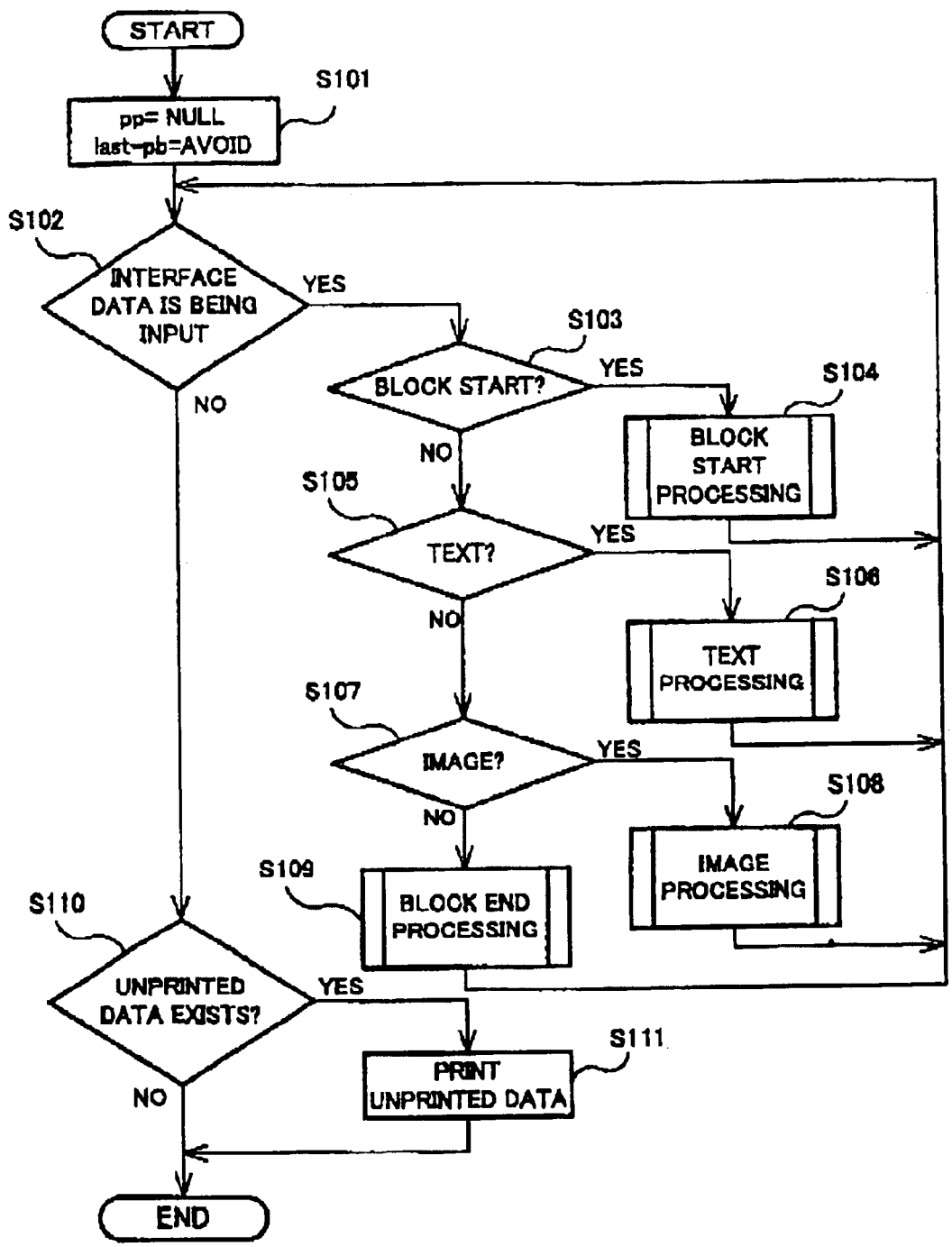
FIG. 4 is a main flowchart of print processing according to the first embodiment of the present invention.

Next, a printing process to be performed in the printer 2a will be described with reference to FIG. 4. FIG. 4 is a main flowchart of the printing process.

In Step 101, the CPU 11 initially sets the page break allowable position pointer "pp" and the page break information "last-pb" stored in the RAM 13 to "NULL" and "AVOID", respectively. This initial setting is for preventing the first page from being blank.

In Step 102, the CPU 11 judges whether or not interface data made from HTML data transmitted from the client computer 3a is being input in the RAM 13. When the CPU 11 judged the interface data to be being input, that is, YES in Step 102, the flow advances to step 103. When the CPU 11 judged the input of the interface data to have been completed, that is, NO in step 102, the flow advances to Step 110.

In Step 103, the CPU 11 judges whether or not the interface data to be processed concerns block start. When the CPU 11 judged the interface data to concern block start, that is, YES in step 103, the flow advances to Step 104, wherein the CPU 11 performs block start processing as will be described later in detail with reference to FIG. 5. When the CPU 11 judged the interface data not to concern block start, that is, No in Step 103, the flow advances to Step 105.

In Step 105, the CPU 11 judges whether or not the interface data to be processed concerns text. When the CPU 11 judged the interface data to concern text, that is, YES in Step 105, the flow advances to Step 106, wherein the CPU 11 performs text processing as will be described later in detail with reference to FIG. 7. When the CPU 11 judged the interface data not to concern text, that is, NO in Step 105, the flow advances to Step 107.

In Step 107, the CPU 11 judges whether or not the interface data to be processed concern image. When the CPU 11 judged the interface data to concern image, that is, YES in Step 107, the flow advances to Step 108, wherein the CPU 11 performs image processing as will be described later in detail with reference to FIG. 8. When the CPU 11 judged the interface data not to concern image, that is, NO in Step 107, the flow advances to Step 109, wherein the CPU 11 performs block end processing as will be described later in detail with reference to FIG. 6.

After any of the above-described processes of block start processing of Step 104, text processing of Step 106, image processing of Step 108, and block end processing of Step 109 is completed, the flow returns to Step 102.

In Step 110, the CPU 11 judges whether or not data having not been printed on a paper as a print medium exists in the interface data. When the CPU 11 judged the interface data to include unprinted data, that is, YES in Step 110, the flow advances to Step 111, wherein the CPU 11 transmits the unprinted data to the printing unit 14. Thereby, the unprinted text data or image data is printed on a print medium by the printing unit 14 to complete the printing process. On the other hand, when the CPU 11 judged all data in the interface data to have been printed, that is, NO in Step 110, then the printing process is ended.

Figure 5:
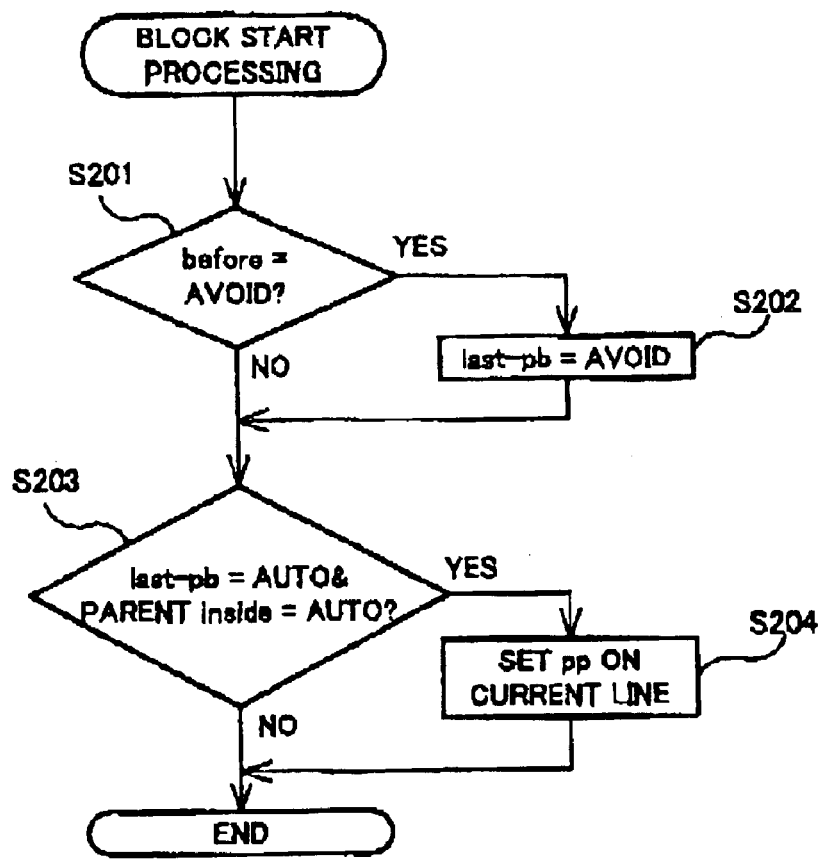
FIG. 5 is a flowchart of block start processing in FIG. 4.

Next, block start processing of Step 104 in the flowchart of FIG. 4 will be described with reference to FIG. 5.

In Step 201, the CPU 11 judges whether or not a command "page-break-before" included in data in the interface data concerning block start is "AVOID". When the CPU 11 judged the command to be "AVOID", that is, YES in Step 201, the flow advances to Step 202, wherein the CPU 11 sets the page break information "last-pb" to "AVOID". The flow then advances to Step 203. On the other hand, when the CPU 11 judged the command not to be "AVOID", that is, NO in Step 201, the flow skips Step 202 and advances to Step 203.

In Step 203, the CPU 11 judges whether or not the current page break information "last-pb" is "AUTO" and whether or not a command "page-break-inside" relating to the upper level block, which means the uppermost level block when blocks are hierarchically disposed in three or more layers, is "AUTO". IF the block being processed, i.e., the target block, has no upper level block, the judgment in Step 203 is made as the command "page-break-inside" relating to the upper level block is "AUTO".

When the CPU 11 judged the page break information "last-pb" to be "AUTO" and the command "page-break-inside" relating to the upper level block to be "AUTO", that is, YES in Step 203, the flow advances to Step 204. When the CPU 11 judged the page break information "last-pb" not to be "AUTO", i.e., the information to be "AVOID", or the command "page-break-inside" relating to the upper level block not to be "AUTO", that is, NO in Step 203, block start processing is ended.

In Step 204, the CPU 11 sets the page break allowable position pointer "pp" on the line being currently processed, i.e., the line where text data or image data is to be disposed next. Block start processing is then ended.

The reason why Step 204 is skipped when the page break information "last-pb" is not "AUTO", is that a page break before the target block must be inhibited when a command "page-break-after" relating to the block immediately before the target block is "AVOID" or a command "page-break-before" relating to the target block is "AVOID". The reason why Step 204 is skipped when the command "page-break-inside" relating to the upper level block is not "AUTO", is that the command "page-break-inside" relating to the upper level block is made effective also in the lower level block, as described above.

Processing about a command "page-break-inside" included in data in the interface data concerning block start is performed not in block start processing but in Step 254 in text processing or Step 273 in image processing.

Figure 6:
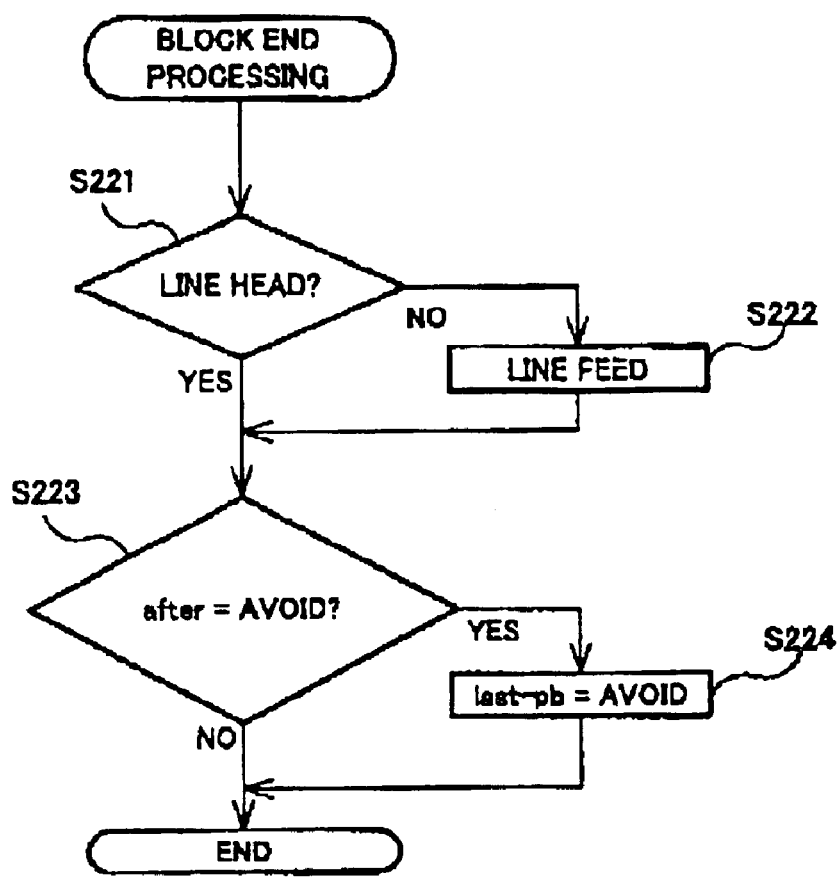
FIG. 6 is a flowchart of block end processing in FIG. 4.

Next, block end processing of Step 109 in the flowchart of FIG. 4 will be described with reference to FIG. 6.

In Step 221, the CPU 11 judges whether or not the currently processing position is a line head. More specifically, as understood from the below description, the CPU 11 judges the processing position to be a line head when the flow is immediately after Step 297 in line feed processing of FIG. 9 or the processing position is in the first line. On the other hand, the CPU 11 judges the processing position not to be a line head when the flow is immediately after Step 253 in text processing of FIG. 7 or immediately after Step 277 in image processing of FIG. 8. In short, after a line feed, till text data or image data is disposed, the CPU 11 judges the processing position to be a line head. When the CPU 11 judged the processing position to be a line head, that is, YES in Step 221, the flow advances to Step 223. When the CPU 11 judged the processing position not to be a line head, that is, NO in Step 221, the flow advances to Step 222.

In Step 222, the CPU 11 executes a line feed. The flow then advances to Step 223. This step is executed for ending each block with a line feed.

In Step 223, the CPU 11 judges whether or not a command "page-break-after" included in data in the interface data concerning block end is "AVOID". When the CPU 11 judged the command to be "AVOID", that is, YES in Step 223, the flow advances to Step 224. In step 224, the CPU 11 updates the page break information "last-pb" into "AVOID". Block end processing is then ended. On the other hand, when the CPU 11 judged the command not to be "AVOID", that is, NO in Step 223, the flow skips Step 224 and block end processing is ended. Step 224 is executed for inhibiting a page break after the target block even if a command "page-break-before" included in data concerning block start for the block next to the target block, is "AUTO".

Figure 7:
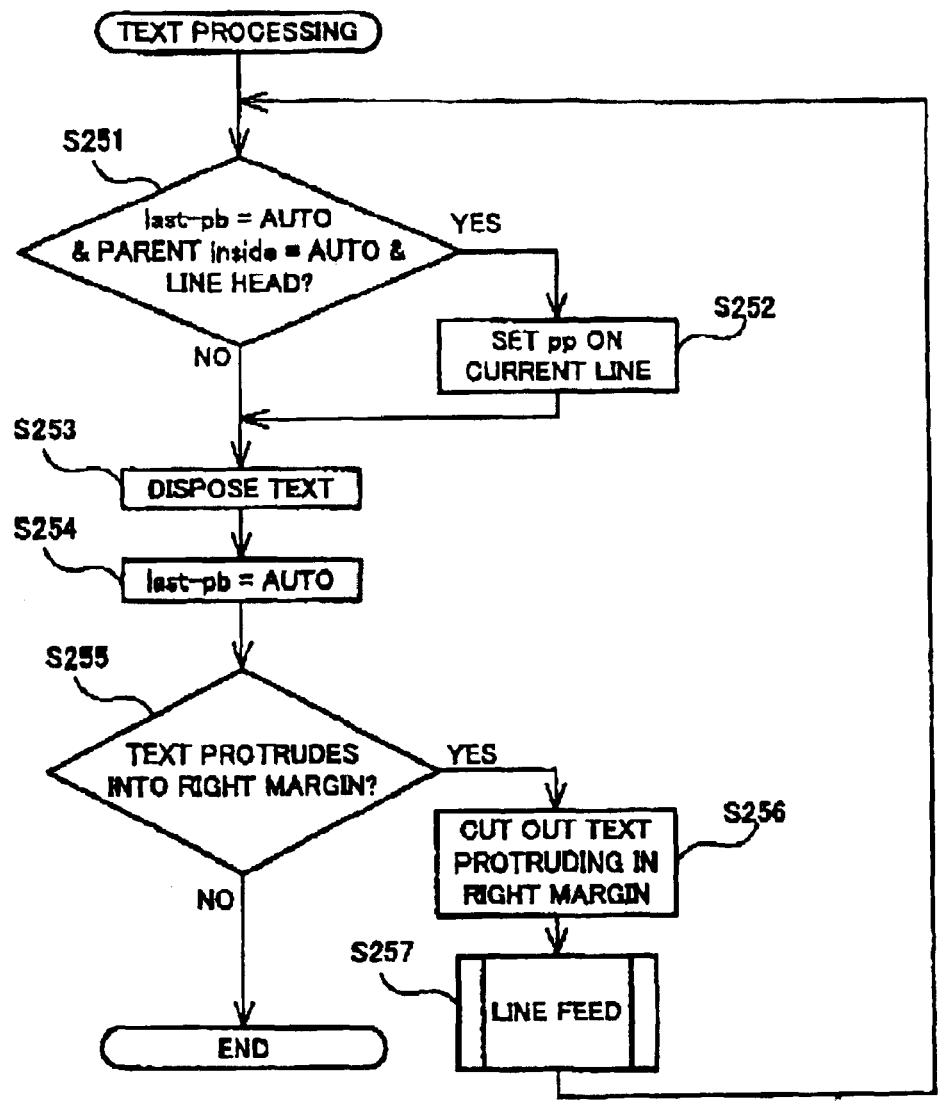
FIG. 7 is a flowchart of text processing in FIG. 4.

Next, text processing of Step 106 in the flowchart of FIG. 4 will be described with reference to FIG. 7. In this embodiment, one or more characters to be disposed are in one logical line in an HTML file. Characters are disposed in a horizontal direction in each line.

In Step 251, the CPU 11 judges whether or not all of three conditions are satisfied: (a) the page break information "last-pb" is "AUTO"; (b) a command "page-break-inside" included in data concerning block start for the upper level block is "AUTO"; and (c) the currently processing position is a line head. When the CPU 11 judged all the conditions to be satisfied, that is, YES in Step 251, the flow advances to Step 252. When the CPU 11 judged at least one of the conditions not to be satisfied, that is, NO in Step 251, the flow advances to Step 253.

In Step 252, the CPU 11 updates the line indicated by the page break allowable position pointer "pp", into the line including the currently processing position. The flow then advances to Step 253.

The reason why Step 252 is skipped when the page break information "last-pb" is not "AUTO", is that a page break must be inhibited immediately before the block when a command "page-break-before" included in data concerning block start for the block is "AVOID", corresponding to Step 202. The reason why Step 252 is skipped when the command "page-break-inside" relating to the upper level block is not "AUTO", is that the command "page-break-inside" relating to the upper level block is made effective also in the lower level block, as described above. The reason why Step 252 is skipped when the processing position is not a line head, is that the page break allowable position pointer "pp" need not be updated at any position other than a line head because the pointer indicates a line.

In Step 253, the CPU 11 disposes a letter string of one logical line constituted by one or more characters in the block, at the currently processing position within the disposition range. Successively in Step 254, the CPU 11 sets the page break information "page-pb" to "AUTO" if there is no command "page-break-inside" relating to the target block or the upper level block or there is a command "page-break-inside: AUTO" relating to the target block or the upper level block. The flow then advances to step 255.

In Step 255, the CPU 11 judges whether or not the letter string disposed in Step 253 protrudes beyond the right end of the disposition range into the right margin. When the CPU 11 judged the letter string to protrude into the right margin, that is, YES in Step 255, the flow advances to Step 256. When the CPU 11 judged the letter string not to protrude into the right margin, that is, NO in Step 255, text processing is ended.

In Step 256, the CPU 11 extracts the part of the letter string protruding in the right margin, from the letter string disposed in Step 253. Successively in Step 257, the CPU 11 performs line feed processing as will be described later with reference to FIG. 9. Thereby, the currently processing position is set to a line head. Every time when line feed processing is performed, the layout lines of the letter string disposed in one logical line increases one by one. The flow then returns to Step 251. Steps 253 and 254 are skipped in the second or later loop.

Figure 8:
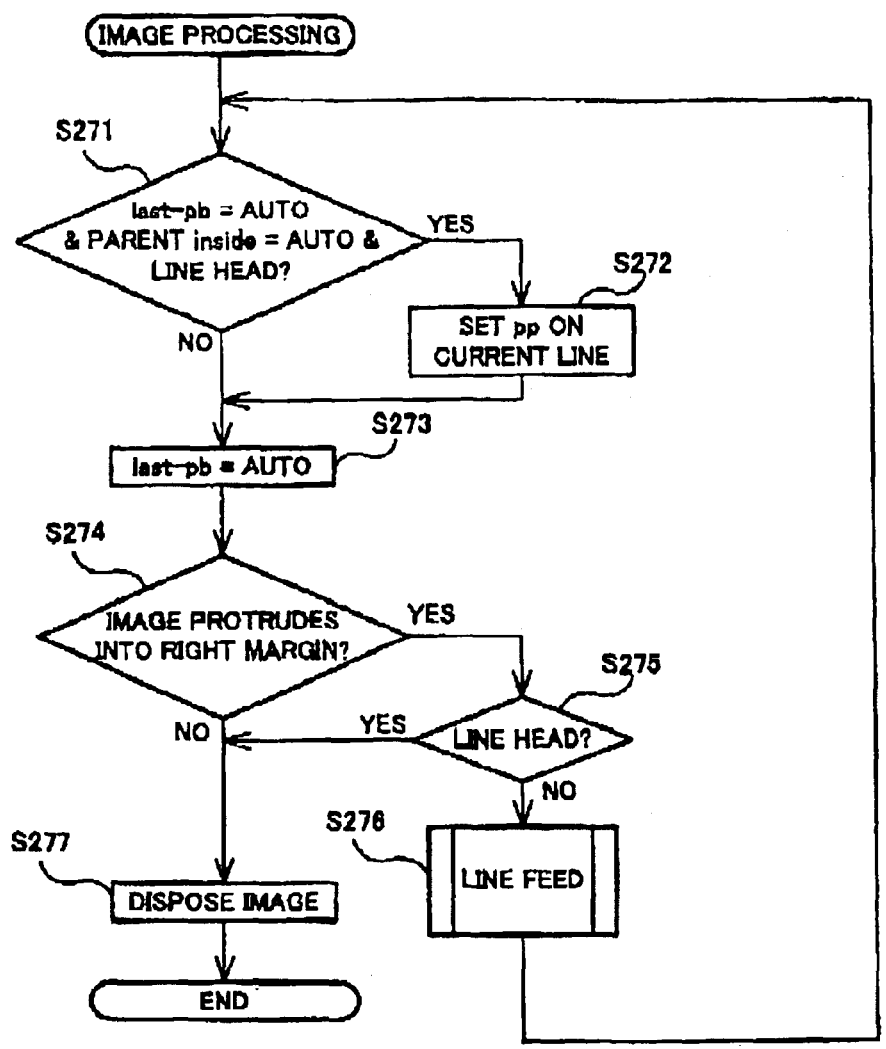
FIG. 8 is a flowchart of image processing in FIG. 4.

Next, image processing of Step 108 in the flowchart of FIG. 4 will be described with reference to FIG. 8. In this embodiment, one image is disposed by one time of image processing.

In Step 271, the CPU 11 judges whether or not all of three conditions are satisfied: (a) the page break information "last-pb" is "AUTO"; (b) a command "page-break-inside" included in data concerning block start for the upper level block is "AUTO"; and (c) the currently processing position is a line head. When the CPU 11 judged all the conditions to be satisfied, that is, YES in Step 271, the flow advances to Step 272. When the CPU 11 judged at least one of the conditions not to be satisfied, that is, NO in Step 271, the flow advances to Step 273.

In Step 272, the CPU 11 updates the line indicated by the page break allowable position pointer "pp", into the line including the currently processing position. The flow then advances to Step 273.

In Step 273, the CPU 11 sets the page break information "page-pb" to "AUTO" if there is no command "page-break-inside" relating to the target block or the upper level block or there is a command "page-break-inside: AUTO" relating to the target block or the upper level block. The flow then advances to Step 274.

In Step 274, referring to the currently processing position, the CPU 11 judges whether or not the image to be disposed in Step 277 as will be described later, protrudes beyond the right end of the disposition range into the right margin. When the CPU 11 judged the image to protrude-into the right margin, that is, YES in Step 274, the flow advances to Step 275. When the CPU 11 judged the image not to protrude into the right margin, that is, NO in step 274, the flow advances to Step 277.

In Step 275, the CPU 11 judges whether or not the currently processing position is a line head. When the CPU 11 judged the processing position to be a line head, that is, YES in Step 275, the flow advances to Step 277. When the CPU 11 judged the processing position not to be a line head, that is, NO in Step 275, the flow advances to Step 276.

Figure 9:
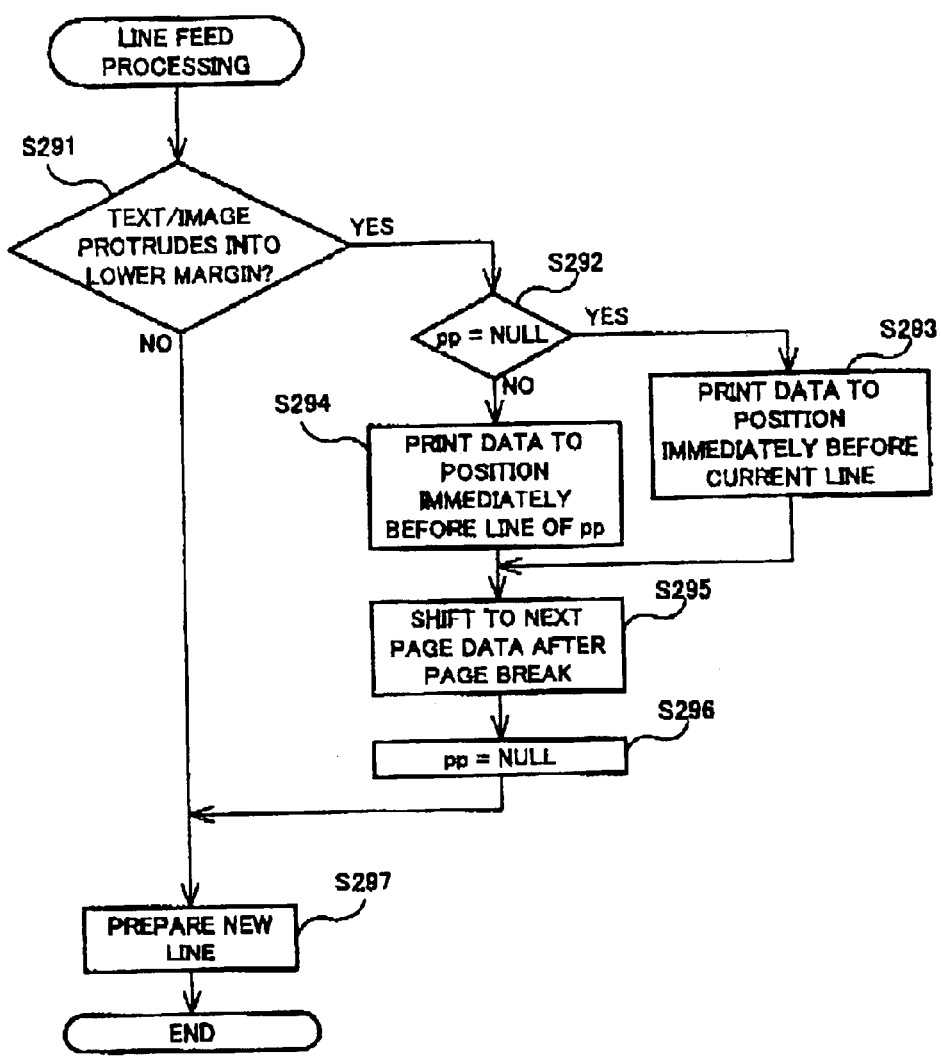
FIG. 9 is a flowchart of line feed processing in FIG. 4.

In Step 276, the CPU 11 performs line feed processing as will be described later with reference to FIG. 9. Thereby, the currently processing position is set to a line head. The flow then returns to Step 271.

In Step 277, the CPU 11 disposes one image at the currently processing position within the disposition range. Image processing is then ended.

Next, line feed processing of Step 257 or 276 in the flowchart of FIG. 7 or 8 will be described with reference to FIG. 9.

In Step 291, the CPU 11 judges whether or not the text data extracted in Step 256 or the image data to be disposed in Step 277 protrudes beyond the lower end of the disposition range into the lower margin when the data is disposed with inserting a line feed immediately before the data. When the CPU 11 judged the text data or the image data to protrude in the lower margin, that is, YES in Step 291, the flow advances to Step 292 because a line feed is necessary. When the CPU 11 judged the text data or the image data not to protrude in the lower margin, that is, NO in Step 291, the flow advances to Step 297.

In Step 292, the CPU 11 judges whether or not the page break allowable position pointer "pp" has been set to "NULL". When the, CPU 11 judged the page break allowable position pointer "pp" to have been set to "NULL", that is, no page break allowable position has been found in processing till now, that is, YES in Step 292, the flow advances to Step 293. On the other hand, when the page break allowable position pointer "pp" has been set to any other than "NULL", that is, the page break allowable position pointer "pp" has been set on a certain line, that is, NO in Step 292, the flow advances to Step 294.

In Step 293, the CPU 11 adopts a position immediately before the line being currently processed, as a page break position. The CPU 11 then transmits, to the printing unit 14, the text data and/or the image data having been disposed to the adopted page break position, as print data. Thereby, the printing unit 14 can print the text data and/or the image data on one page of sheet such that the text data and/or the image data immediately before the line being currently processed is vertically and horizontally within the disposition range. The flow then advances to Step 295.

In Step 294, the CPU 11 adopts a position immediately before the line indicated by the page break allowable position pointer "pp", as a page break position. The CPU 11 then transmits, to the printing unit 14, the text data and/or the image data having been disposed to the adopted page break position, as print data. Thereby, the printing unit 14 can print the text data and/or the image data on one page of sheet such that the text data and/or the image data immediately before the line indicated by the page break allowable position pointer "pp" is vertically and horizontally within the disposition range. The flow then advances to Step 295.

In step 295, the CPU 11 shifts, to the next page, the data not printed in Step 293 or 294.

Subsequently in Step 296, the CPU 11 sets the page break allowable position pointer "pp" to "NULL" so that the next page is not blank upon printing. The flow then advances to Step 297. In Step 297, the CPU 11 prepares a new line under the line having been processed. The CPU 11 then disposes the text data and/or the image data in the new line from its left end. Line feed processing is then ended.

Figure 10A:
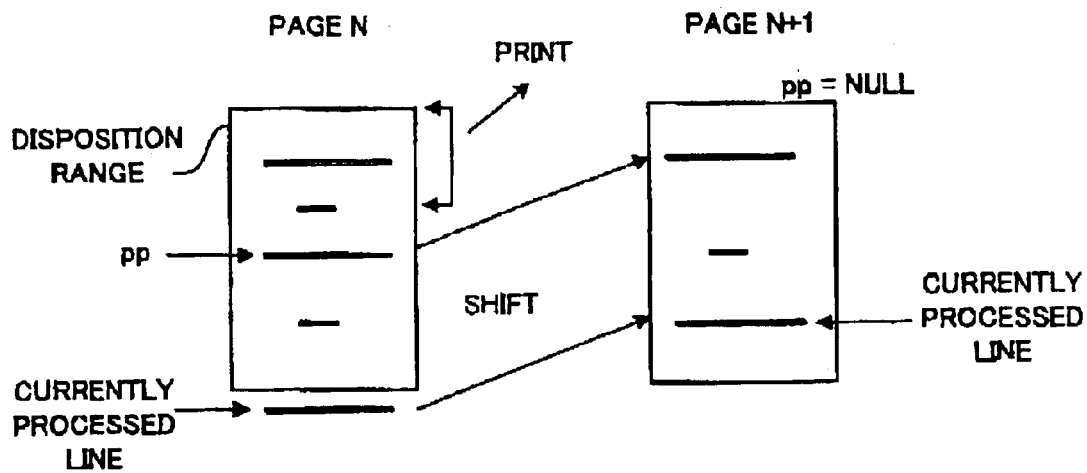
FIG. 10A illustrates an example of text shift to the next page according to the first embodiment of the present invention.

When the page break allowable position pointer "pp" is set on a certain line, as an example of text shift in FIG. 10A, the data to the position immediately before the line indicated by the page break allowable position pointer "pp" is printed on the page N. The data from the line indicated by the page break allowable position pointer "pp" to the final line of the text data to be disposed is shifted to the next page N+1. Lines are prepared in order from the upper end of the disposition range in the page N+1 and the shifted data is disposed on each line in order from its left end.

Figure 10B:
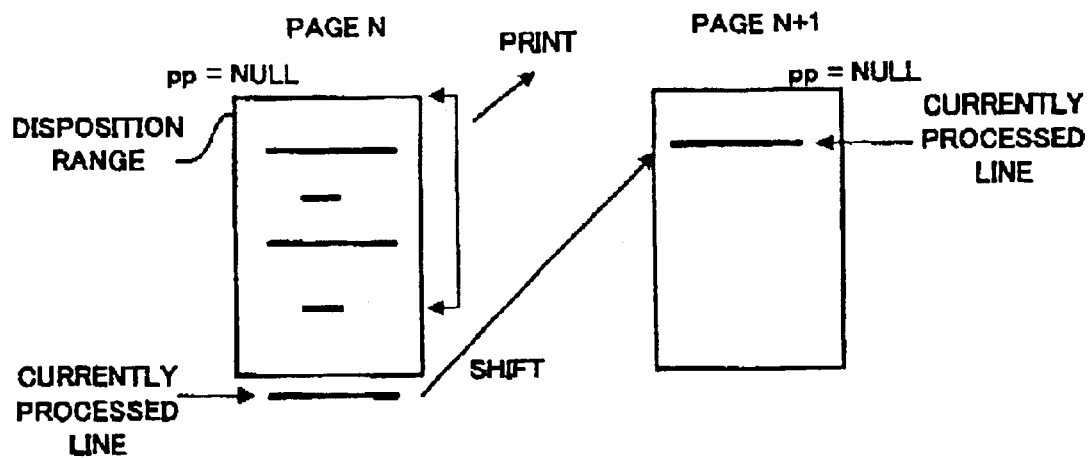
FIG. 10B illustrates another example of text shift to the next page according to the first embodiment of the present invention.

When the page break allowable position pointer "pp" is set to "NULL", as an example of text shift in FIG. 10B, the data to the position immediately before the line being currently processed is printed on the page N. The data on and after the line being currently processed is shifted to the next page N+1. Lines are prepared in order from the upper end of the disposition range in the page N+1 and the shifted data is disposed on each line in order from its left end.

Figure 11:
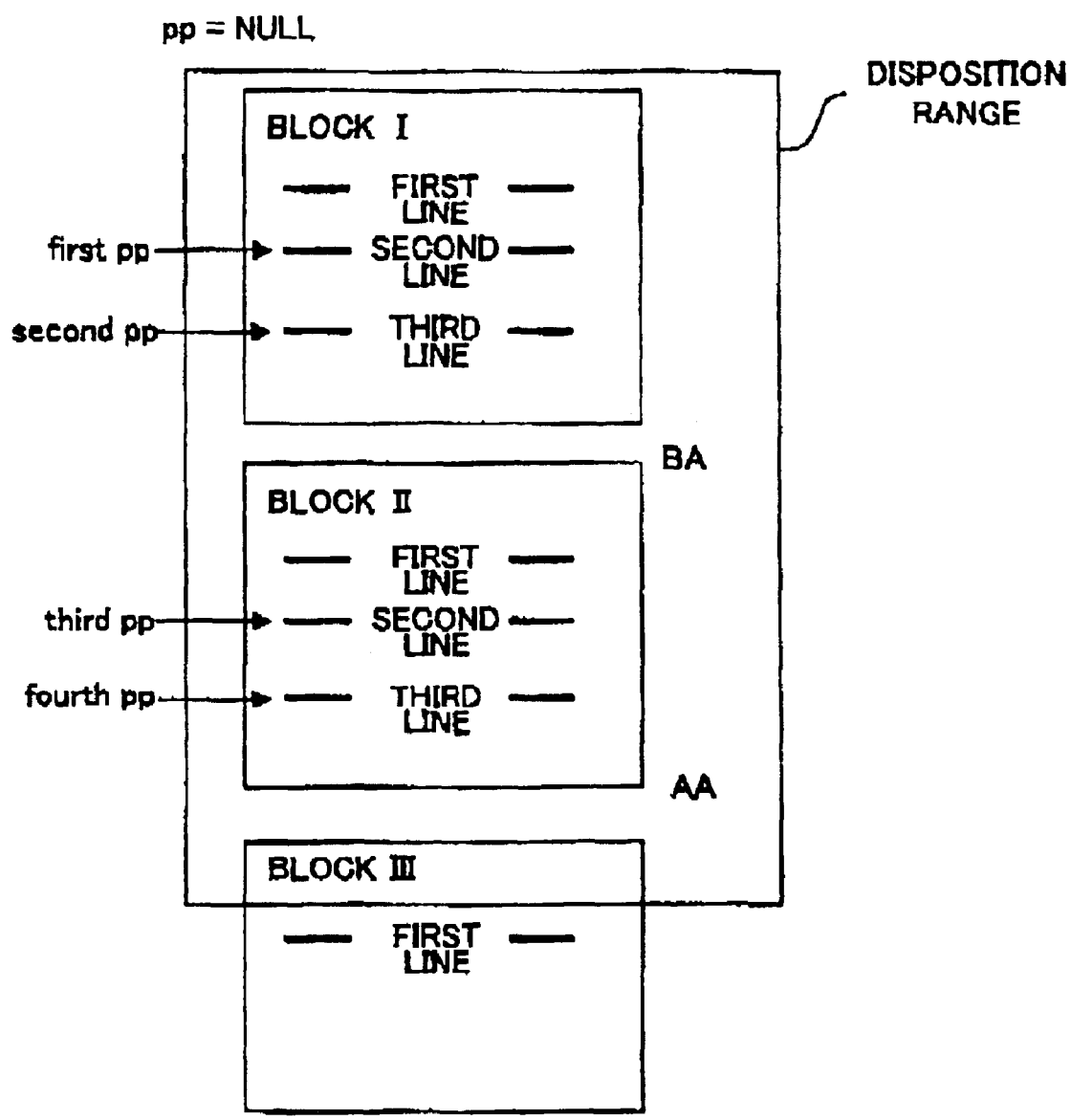
FIG. 11 illustrates an example of page break position determination processing according to the first embodiment of the present invention.

Next, an example of page break position determination processing will be described further with reference to FIG. 11. In this example, an HTML file includes therein three blocks, i.e., blocks I, II, and III, in no hierarchical relation to each other. Each block includes text data only. Only the block II includes therein a command BA for inhibiting a page break before the block and a command AA for inhibiting a page break after the block.

First, in Step 101, the page break allowable position pointer "pp" and the page break information "last-pb" are initially set to "NULL" and "AVOID", respectively. The flow then advances to steps 102, 103, and 104 and block start processing for the block I starts. Because data in the interface data concerning block start includes therein no command "page-break-before", Step 201 is skipped. In step 203, the page break information "last-pb" is judged to be "AVOID". Thus, block start processing for the block I ends in the initial state wherein the page break allowable position pointer "pp" is "NULL" and the page break information "last-pb" is "AVOID".

Next, the flow advances to Steps 102, 103, 105, and 106 and text processing for the block I starts. Because the page break information "last-pb" is "AVOID" at the time of judgment in Step 251, the flow skips Step 252 and advances to Step 253, In Step 253, the text data is disposed on the first line in the disposition range, i.e., on the first line of the block I. In Step 254, the page break information "last-pb" is set to "AUTO". If the text data disposed on the first line protrudes into the right margin, the part of the text data protruding in the right margin is extracted in Step 256, and the flow then advances to Step 257 for line feed processing. In line feed processing, the second line under the first line of the block I is judged not to protrude in the lower margin of the disposition range and a new line, the second line, is prepared in Step 297. The flow then returns to Step 251. In processing of the second line/because all the three conditions in Step 251 are satisfied, the flow advances to Step 252, wherein the page break allowable position pointer "pp" is set on the second line of the block I being currently processed, as the first page break allowable position pointer "pp". Also, in Step 252 in the next loop, the page break allowable position pointer "pp" is set on the third line of the block I being currently processed, as the second page break allowable position pointer "pp". The text data disposed on the third line of the block I is judged in Step 255 not to protrude into the right margin and then text processing for the block I ends.

Next, the flow advances to Steps 102, 103, 105, 107, and 109 and block end processing for the block I starts. Unless the currently processing position is a line head, a line feed is executed in Step 222 and then the flow advances to Step 223. Because data in the interface data concerning block end for the block I includes therein no command "page-break-after", Step 223 is skipped. Thus, block end processing for the block I ends in the state wherein the page break information "last-pb" is kept "AUTO".

Next, the flow advances to Steps 102, 103, and 104 and block start processing for the block II starts. Because data in the interface data concerning block start includes therein a command "page-break-before: AVOID", the page break information "last-pb" is set to "AVOID" instep 202. This is for inhibiting a page break on the first line of the block II. Subsequently in Step 203, the page break information "last-pb" is judged to be "AVOID". Thus, block start processing for the block II ends in the state wherein the page break allowable position pointer "pp" is on the third line of the block I and the page break information "last-pb" is "AVOID".

Next, the flow advances to Steps 102, 103, 105, and 106 and text processing for the block II starts. Because the page break information "last-pb" is "AVOID" at the time of judgment in Step 251, the flow skips Step 252 and advances to Step 253. In Step 253, the text data is disposed on the fourth line in the disposition range, i.e., on the first line of the block II. In Step 254, the page break information "last-pb" is set to "AUTO". If the text data disposed on the first line of the block II protrudes into the tight margin, the part of the text data protruding in the right margin is extracted in Step 256, and the flow then advances to Step 257 for line feed processing. In line feed processing, the second line under the first line of the block II is judged not to protrude in the lower margin of the disposition range and a new line, the second line, is prepared in Step 297. The flow then returns to Step 251. In processing of the second line, because all the three conditions in Step 251 are satisfied, the flow advances to Step 252, wherein the page break allowable position pointer "pp" is set on the second line of the block II being currently processed, as the third page break allowable position pointer "pp". Also, in Step 252 in the next loop, the page break allowable position pointer "pp" is set on the third line of the block II being currently processed, as the fourth page break allowable position pointer "pp". The text data disposed on the third line of the block II is judged in Step 255 not to protrude into the right margin and then text processing for the block II ends.

Next, the flow advances to Steps 102, 103, 105, 107, and 109 and block end processing for the block II starts. Unless the currently processing position is a line head, a line feed is executed in Step 222 and then the flow advances to Step 223. Because data in the interface data concerning block end for the block II includes therein a command "page-break-after: AVOID", the page break information "last-pb" is set to "AVOID" in Step 224. Block end processing for the block II then ends.

Next, the flow advances to Steps 102, 103, and 104 and block start processing for the block III starts. Because data in the interface data concerning block start includes therein no command "page-break-before: AVOID", Step 201 is skipped. Subsequently in Step 203, the page break information "last-pb" is judged to be "AVOID". Thus, block start processing for the block III ends in the state wherein the page break allowable position pointer "pp" is on the third line of the block II and the page break information "last-pb" is "AVOID".

Next, the flow advances to Steps 102, 103, 105, and 106 and text processing for the block III starts. Because the page break information "last-pb" is "AVOID" at the time of judgment in Step 251, the flow skips Step 252 and advances to Step 253. In Step 253, the text data is disposed on the seventh line in the disposition range, i.e., on the first line of the block III. In Step 254, the page break information "last-pb" is set to "AUTO". If the text data disposed on the first line of the block III protrudes into the right margin, the part of the text data protruding in the right margin is extracted in Step 256, and the flow then advances to Step 257 for Line feed processing. In line feed processing, the second line under the first line of the block III is judged to protrude in the lower margin of the disposition range and further the page break allowable position pointer "pp" is judged in Step 292 not to be "NULL". Therefore, the flow advances to Step 294, wherein a position immediately before the third line of the block II, i.e., in between the second and third lines of the block II, is adopted as a page break position and the text data to the position is transmitted to the printing unit 14. Subsequently in Step 295, the text data on the third line of the block II and on the first line of the block III is shifted to the next page. In Step 296, the page break allowable position pointer "pp" is set to "NULL". In Step 297, the text data shifted to the next page is disposed on a new line prepared as the first line in the next page. Line feed processing then ends.

As described above, in this embodiment, a page break allowable position is searched for from the upper end toward the lower end of each page, using a command for inhibiting a page break, such as "page-break-before: AVOID", "page-break-inside: AVOID", and "page-break-after: AVOID". Every time when a page break allowable position is found, the page break allowable position pointer "pp" is updated in order. When a page break is necessary, a position immediately before the line indicated by the page break allowable position pointer "pp" is adopted as a page break position. Thus, a page break can be inserted at a proper position.

Because the page break allowable position pointer "pp" is updated every time when a page break allowable position is found, the necessary memory capacity may be little.

If no page break allowable position could be found, a position immediately before the line protruding in the lower margin is adopted as a page break position. Therefore, the area in the paper where no data is printed can be the minimum. As a result, the time necessary for printing is shortened.

Further, because the data protruding in the right margin is disposed on the next line, a visually beautiful document layout can be obtained. Further, because a page break position is determined with taking account of the data to protrude in the right margin being disposed on the next line, there is no case wherein the page break position is shifted in accordance with the data quantity. A page break position can be determined with high accuracy.

In addition, because each command for inhibiting a page break is according to the standard of CSS, the applicability is high.

In a modification of this embodiment, the page break allowable position pointer "pp" may not be updated even when a new page break allowable position is detected. In this modification, a plurality of page break allowable positions in each page may be stored and the page break allowable position nearest to the lower end of the page is selected as a page break position out of the plurality of stored page break allowable positions.

Next, a second embodiment of the present invention will be described. The second embodiment has many overlaps with the first embodiment and thus differences from the first embodiment will be mainly described below.

In this embodiment, not the page break allowable position pointer "pp" indicates the position of a line where a page break is allowable, as in the first embodiment, but the CPU 11 of the printer 2a assigns a mark to each line where a page break is allowable, and the RAM 13 stores therein the line and the mark related to each other. When a page break is necessary, a page break position is determined on the basis of the mark stored in the RAM 13.

In the second embodiment performed is substantially the same main process as that of FIG. 4 in the first embodiment. However, because the second embodiment does not use the page break allowable position pointer "pp", processing of setting the page break allowable position pointer "pp" to "NULL" is not performed in Step 101 of the main process. Block end processing in the second embodiment is substantially the same as block end processing of FIG. 6 in the first embodiment.

Figure 12:
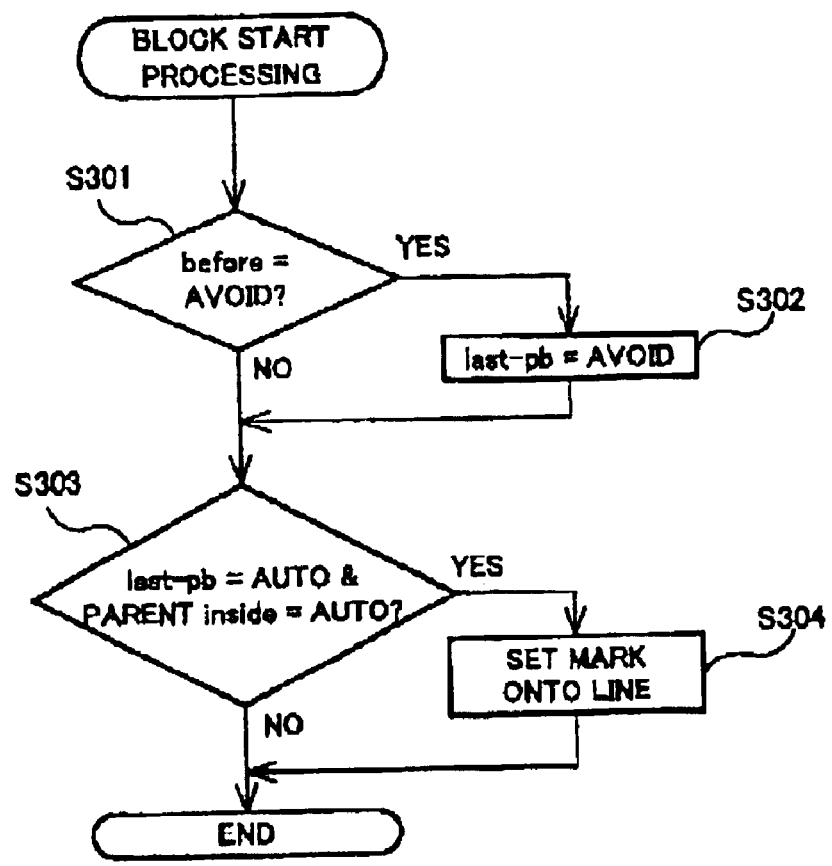
FIG. 12 is a flowchart of block start processing according to a second embodiment of the present invention.

Next, block start processing according to this embodiment will be described with reference to FIG. 12.

In Step 301, the CPU 11 judges whether or not a command "page-break-before" included in data in the interface data concerning block start is "AVOID". When the CPU 11 judged the command to be "AVOID", that is, YES in Step 301, the flow advances to Step 302, wherein the CPU 11 sets the page break information "last-pb" to "AVOID". The flow then advances to Step 303. On the other hand, when the CPU 11 judged the command not to be "AVOID", that is, NO in Step 301, the flow skips Step 302 and advances to Step 303.

In Step 303, the CPU 11 judges whether or not the current page break information "last-pb" is "AUTO" and whether or not a command "page-break-inside" relating to the upper level block is "AUTO". If the block being processed, i.e., the target block, has no upper level block, the judgment in Step 303 is made as the command "page-break-inside" relating to the upper level block is "AUTO".

When the CPU 11 judged the page break information "last-pb" to be "AUTO" and the command "page-break-inside" relating to the upper level block to be "AUTO", that is, YES in Step 303, the flow advances to Step 304. When the CPU 11 judged the page break information "last-pb" not to be "AUTO" or the command "page-break-inside" relating to the upper level block not to be "AUTO", that is, NO in Step 303, block start processing is ended.

In Step 304, the CPU 11 sets a mark indicating that a page break is allowable, to the line being currently processed in the target block, i.e., the line where data is to be disposed next. Block start processing is then ended.

Figure 13:
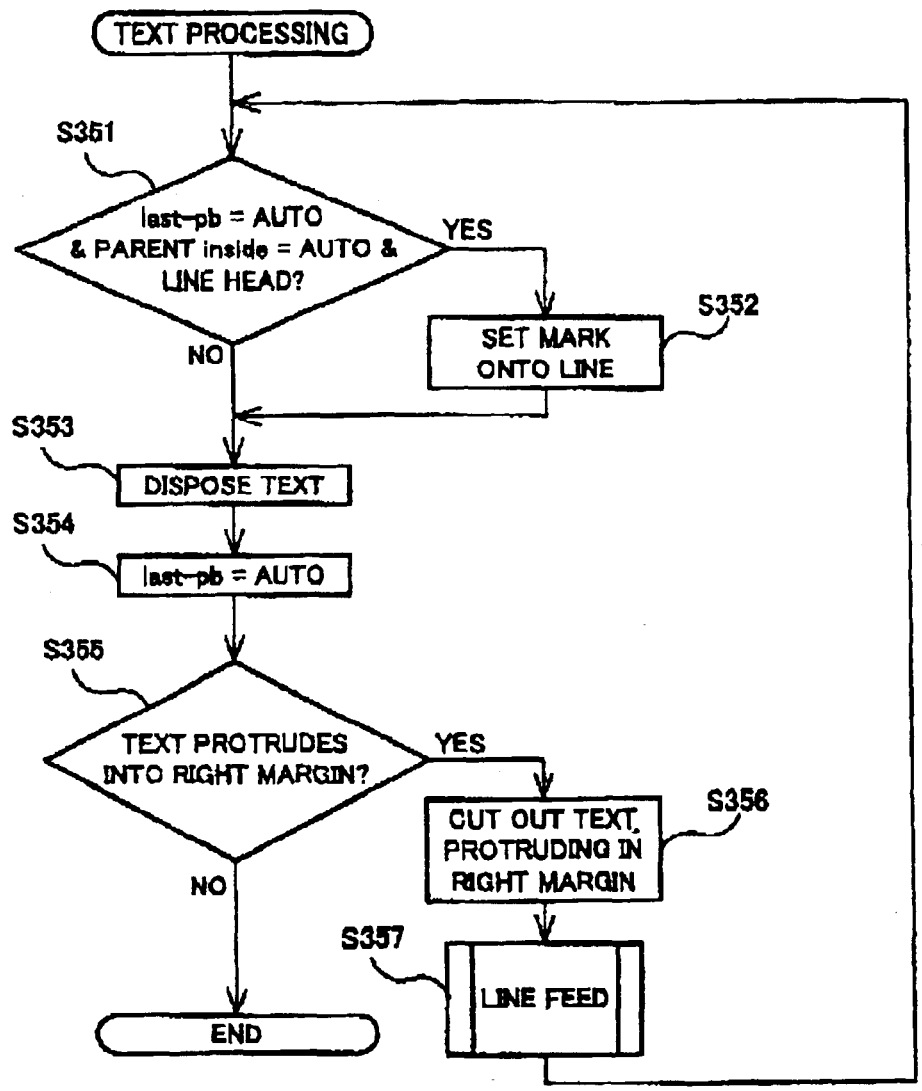
FIG. 13 is a flowchart of text processing according to the second embodiment of the present invention.

Next, text processing according to this embodiment will be described with reference to FIG. 13.

In Step 351, the CPU 11 judges whether or not all of three conditions are satisfied: (a) the page break information "last-pb" is "AUTO", (b) a command "page-break-inside" included in data concerning block start for the upper level block is "AUTO"; and (c) the currently processing position is a line head. When the CPU 11 judged all the conditions to be satisfied, that is, YES in Step 351, the flow advances to Step 352. When the CPU 11 judged at least one of the conditions not to be satisfied, that is, NO in Step 351, the flow advances to Step 353.

Figure 15:
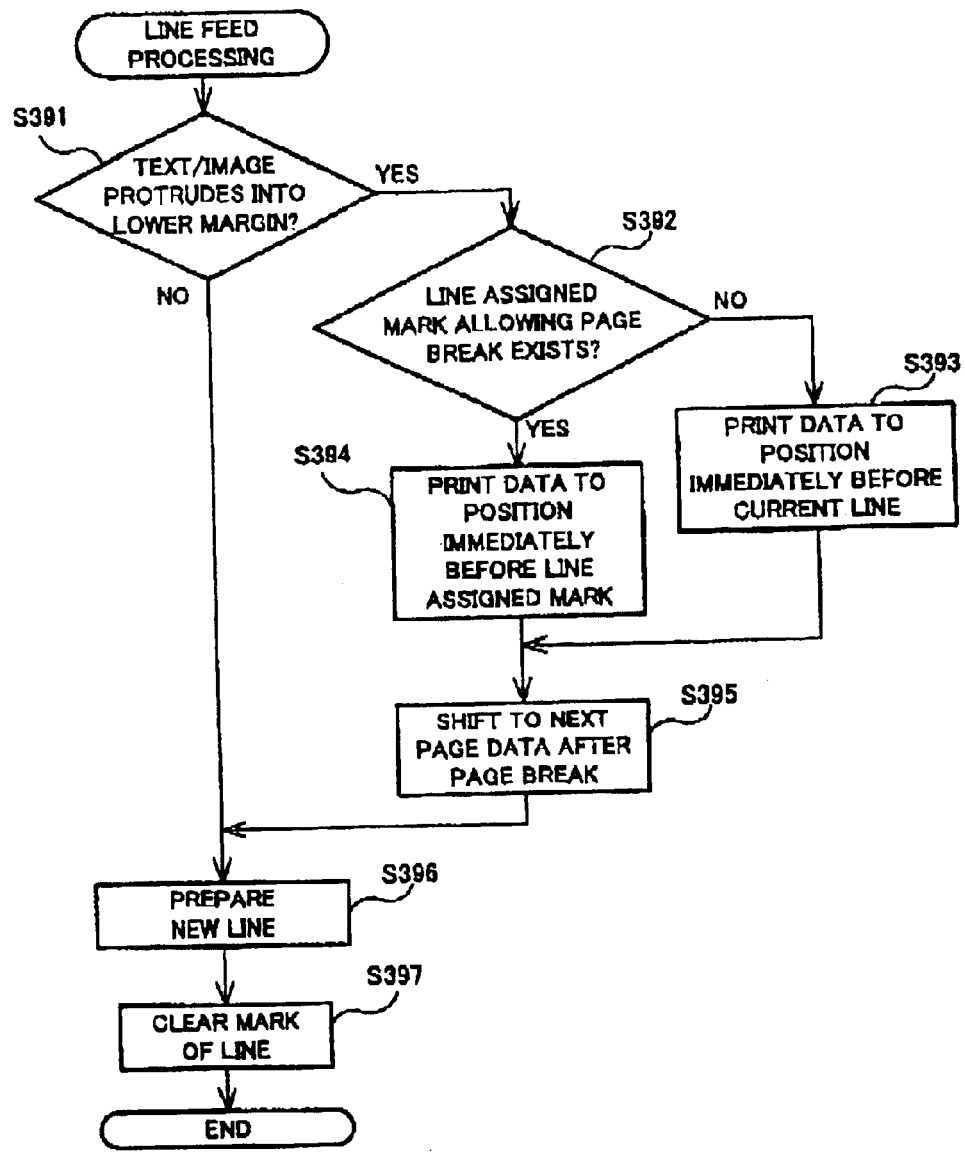
FIG. 15 is a flowchart of line feed processing according to the second embodiment of the present invention.

In step 352, the CPU 11 sets a mark indicating that a page break is allowable, to the line being currently processed in the target block, for example, a line newly prepared by line feed processing (see Step 396 in FIG. 15). The flow then advances to Step 353.

In Steps 353 and 354, the CPU 11 performs substantially the same processes as in steps 253 and 254, respectively.

In Step 355, the CPU 11 judges whether or not the letter string disposed in Step 353 protrudes beyond the right end of the disposition range into the right margin. When the CPU 11 judged the letter string to protrude into the right margin, that is, YES in Step 355, the flow advances to Step 356. When the CPU 11 judged the letter string not to protrude into the right margin, that is, NO in Step 355, text processing is ended.

In Step 356, the CPU 11 extracts the part of the letter string protruding in the right margin, from the letter string disposed in Step 353. Successively in Step 357, the CPU 11 performs line feed processing as will be described later with reference to FIG. 15. Thereby, the currently processing position is set to a line head. Every time when line feed processing is performed, the layout lines of the letter string disposed in one logical line increases one by one. The flow then returns to Step 351. Steps 353 and 354 are skipped in the second or later loop.

Figure 14:
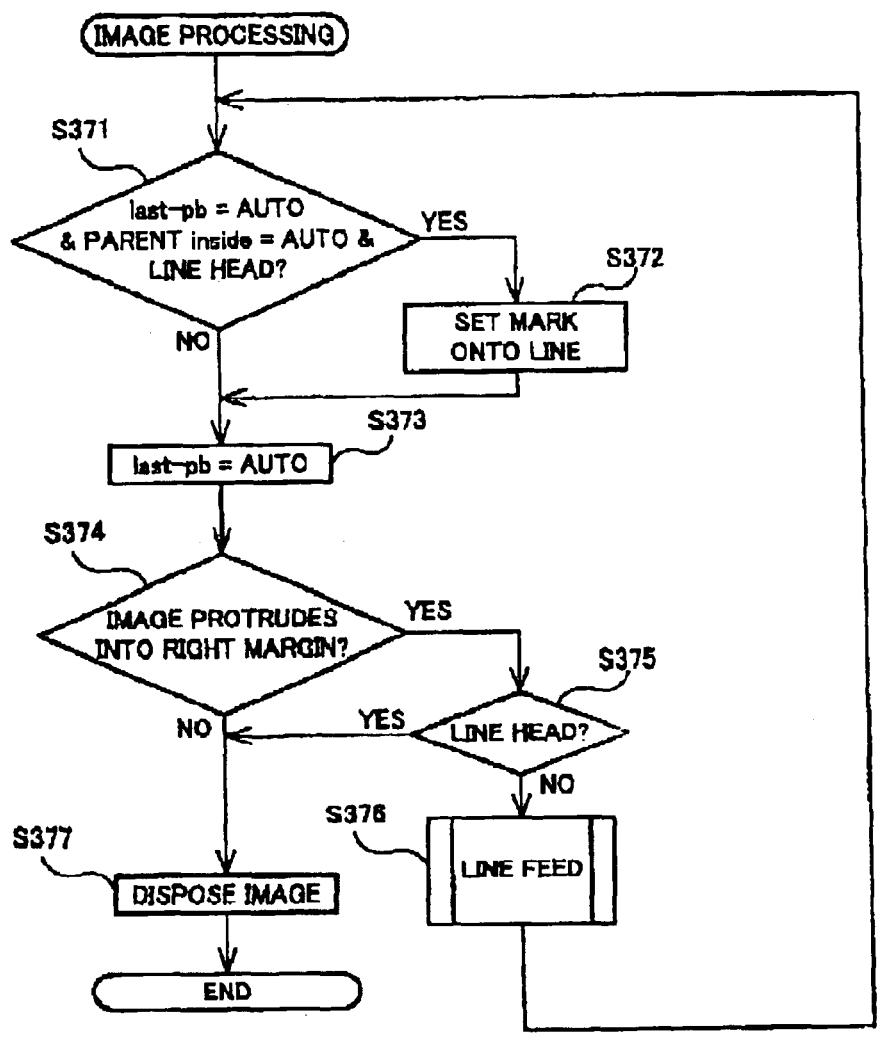
FIG. 14 is a flowchart or image processing according to the second embodiment of the present invention.

Next, image processing according to this embodiment will be described with reference to FIG. 14.

In Step 371, the CPU 11 judges whether or not all of three conditions are satisfied: (a) the page break information "last-pb" is "AUTO"; (b) a command "page-break-inside" included in data concerning block start for the upper level block is "AUTO"; and (c) the currently processing position is a line head. When the CPU 11 judged all the conditions to be satisfied, that is, YES in Step 371, the flow advances to Step 372. When the CPU 11 judged at least one of the conditions not to be satisfied, that is, NO in Step 371, the flow advances to Step 373.

In step 372, the CPU 11 sets a mark indicating that a page break is allowable, to the line being currently processed in the target block, for example, a line newly prepared by line feed processing (see Step 396 in FIG. 15). The flow then advances to Step 373.

In Step 373, the CPU 11 performs substantially the same process as in Step 273.

In Step 374, referring to the currently processing position, the CPU 11 judges whether or not the image to be disposed in Step 377 as will be described later, protrudes beyond the right end of the disposition range into the right margin. When the CPU 11 judged the image to protrude into the right margin, that is, YES in Step 374, the flow advances to Step 375. When the CPU 11 judged the image not to protrude into the right margin, that is, NO in Step 374, the flow advances to step 377, In Step 375, the CPU 11 judges whether or not the currently processing position is a line head. When the CPU 11 judged the processing position to be a line head, that is, YES in Step 375, the flow advances to Step 377. When the CPU 11 judged the processing position not to be a line head, that is, NO in Step 375, the flow advances to Step 376.

In Step 376, the CPU 11 performs line feed processing as will be described later with reference to FIG. 15. Thereby, the currently processing position is set to a line head. The flow then returns to Step 371.

In Step 377, the CPU 11 disposes one image at the currently processing position within the disposition range. Image processing is then ended.

Next, line feed processing according to this embodiment will be described with reference to FIG. 15.

In Step 391, the CPU 11 judges whether or not the text data extracted in Step 356 or the image data to be disposed in Step 377 protrudes beyond the lower end of the disposition range into the lower margin when the data is disposed with inserting a line feed immediately before the data. When the CPU 11 judged the text data or the image data to protrude in the lower margin, that is, YES in Step 391, the flow advances to Step 392 because a line feed is necessary. When the CPU 11 judged the text data or the image data not to protrude in the lower margin, that is, NO in Step 391, the flow advances to Step 396, In Step 392, the CPU 11 judges whether or not a line exists to which a mark indicating that a page break is allowable was set. When the CPU 11 concluded that a line existed to which a mark indicating that a page break is allowable had been set, that is, YES in Step 392, the flow advances to Step 394. When the CPU 11 concluded that no line existed to which a mark indicating that a page break is allowable had been set, that is, when no page break allowable position has been found in processing till now, that is, NO in Step 392, the flow advances to Step 393.

In Step 393, the CPU 11 adopts a position immediately before the line being currently processed, as a page break position. The CPU 11 then transmits, to the printing unit 14, the text data and/or the image data having been disposed to the adopted page break position, as print data. Thereby, the printing unit 14 can print the text data and/or the image data on one page of sheet such that the text data and/or the image data immediately before the line being currently processed is vertically and horizontally within the disposition range. The flow then advances to Step 395.

In Step 394, the CPU 11 adopts a position immediately before the lowermost marked line in the page, as a page break position. The CPU 11 then transmits, to the printing unit 14, the text data and/or the image data having been disposed to the adopted page break position, as print data. Thereby, the printing unit 14 can print the text data and/or the image data on one page of sheet such that the text data and/or the image data immediately before the lowermost marked line in the page is vertically and horizontally within the disposition range. The flow then advances to Step 395.

In Step 395, the CPU 11 shifts, to the next page, the data not printed in Step 393 or 394.

In Step 396, the CPU 11 performs substantially the same process as in Step 297. In Step 397, the CPU 11 clears a mark set to each line prepared in step 396, or sets another mark than the mark indicating that a page break is allowable. Line feed processing is then ended.

As described above, in this embodiment, a page break allowable position is searched for from the upper end toward the lower end of each page, using a command for inhibiting a page break, such as "page-break-before: AVOID", "page-break-inside: AVOID", and "page-break-after: AVOID". Every time when a page break allowable position is founds a mark is set. When a page break is necessary, a position immediately before the lowermost marked line in the page is adopted as a page break position. Thus, a page break can be inserted at a proper position. In addition, also in the second embodiment, the same advantages as in the first embodiment can be obtained.

Next, a third embodiment of the present invention will be described. The third embodiment has many overlaps with the first embodiment and thus differences from the first embodiment will be mainly described below.

In this embodiment, not the page break allowable position pointer "pp" indicates the position of a line where a page break is allowable, as in the first embodiment, but the CPU 11 of the printer 2a assigns a mark having a value of nest level, which indicates an order in a nesting structure, to each line where a page break is allowable, and the RAM 13 stores therein the line and the nest level related to each other. In this case, the CPU 11 functions as an assigning unit. When a page break is necessary, a page break position is determined on the basis of the nest level stored in the RAM 13. In this embodiment, a value of nest level corresponds to a priority-level.

In the third embodiment performed is substantially the same main process as that of FIG. 4 in the first embodiment. However, because the third embodiment does not use the page break allowable position pointer "pp", processing of setting the page break allowable position pointer "pp" to "NULL" is not performed in Step 101 of the main process.

Figure 16:
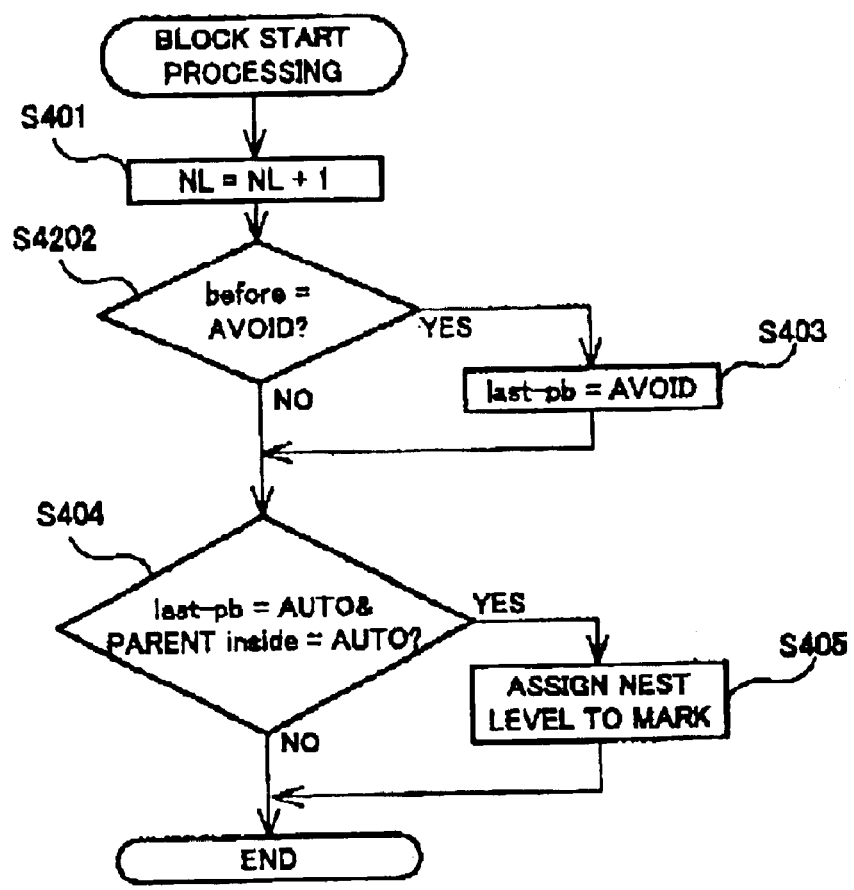
FIG. 16 is a flowchart of block start processing according to a third embodiment of the present invention.

Next, block start processing according to this embodiment will be described with reference to FIG. 16.

In Step 401, the CPU 11 increases the nest level NL by one, that is, NL=NL+1. By processing in Step 401, for example, the nest level NL of the uppermost level block, i.e., the first block, is set to one, the nest level NL of the second block included in the first block is set to two, and the nest level NL of the third block included in the second block is set to three. In this case, the priority of page break lowers as the nest level increases as one, two, three, and so on.

In Step 402, the CPU 11 judges whether or not a command "page-break-before" included in data in the interface data concerning block start is "AVOID". When the CPU 11 judged the command to be "AVOID", that is, YES in Step 402, the flow advances to step 403, wherein the CPU 11 sets the page break information "last-pb" to "AVOID". The flow then advances to Step 404. On the other hand, when the CPU 11 judged the command not to be "AVOID", that is, NO in Step 402, the flow skips Step 403 and advances to step 404.

In Step 404, the CPU 11 judges whether or not the current page break information "last-pb" is "AUTO" and whether or not a command "page-break-inside" relating to the upper level block is "AUTO". When the CPU 11 judged the page break information "last-pb" to be "AUTO" and the command "page-break-inside" relating to the upper level block to be "AUTO", that is, YES in Step 404, the flow advances to step 405. When the CPU 11 judged the page break information "last-pb" not to be "AUTO" or the command "page-break-inside" relating to the upper level block not to be "AUTO", that is, NO in Step 404, block start processing is ended.

In Step 405, the CPU 11 sets a mark having a value of nest level NL having been increased by one in Step 401, to the line being currently processed in the target block, i.e., the line where data is to be disposed next. Block start processing is then ended. The value of nest level NL assigned to the mark indicates a priority level. The lower the value is, the higher the priority level for page break is.

Figure 17:
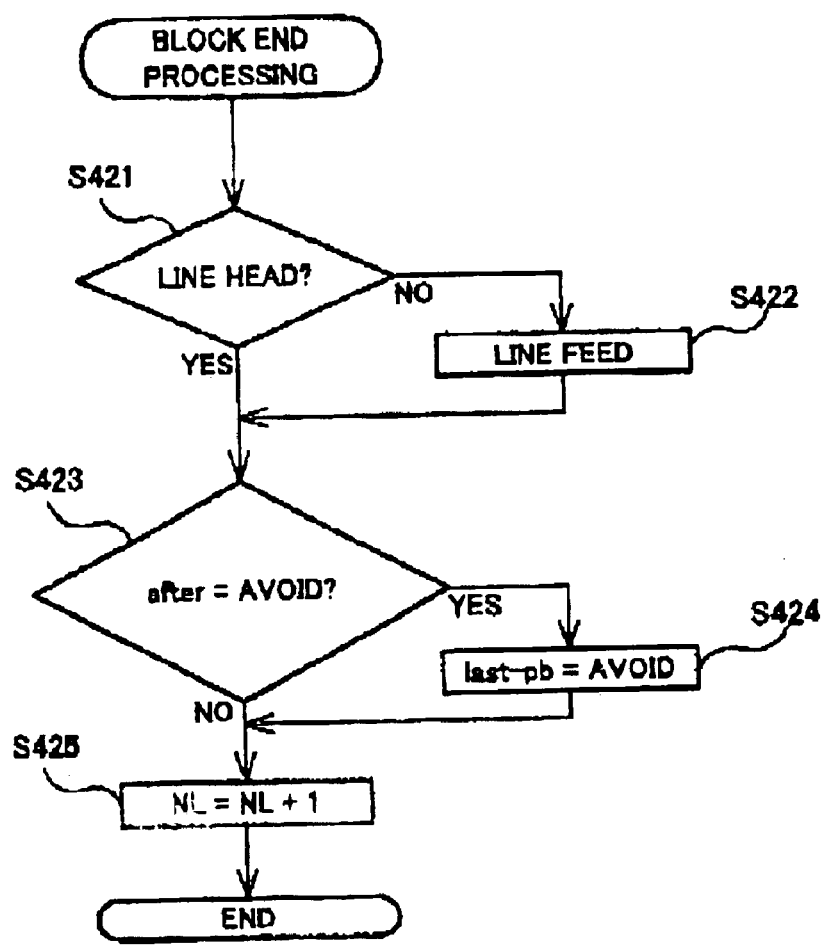
FIG. 17 is a flowchart of block end processing according to the third embodiment of the present invention.

Next, block end processing according to this embodiment will be described with reference to FIG. 17.

In Step 421, the CPU 11 judges whether or not the currently processing position is a line head. When the CPU 11 judged the processing position to be a line head, that is, YES in Step 421, the flow advances to Step 423. When the CPU 11 judged the processing position not to be a line head, that is, No in Step 421, the flow advances to Step 422.

In Step 422, the CPU 11 executes a line feed. The flow then advances to Step 423. This step is executed for ending each block with a line feed.

In Step 423, the CPU 11 judges whether or not a command "page-break-after" included in data in the interface data concerning block end is "AVOID". When the CPU 11 judged the command to be "AVOID", that is, YES in step 423, the flow advances to Step 424. In Step 424, the CPU 11 updates the page break information "last-pb" into "AVOID". Block end processing is then ended. On the other hand, when the CPU 11 judged the command not to be "AVOID", that is, NO in Step 423, the flow skips Step 424 and advances to Step 425.

In Step 425, the CPU 11 decreases the nest level NL by one, that is, NL=NL-1, because the currently processed block is ended. Block end processing is then ended.

Figure 18:
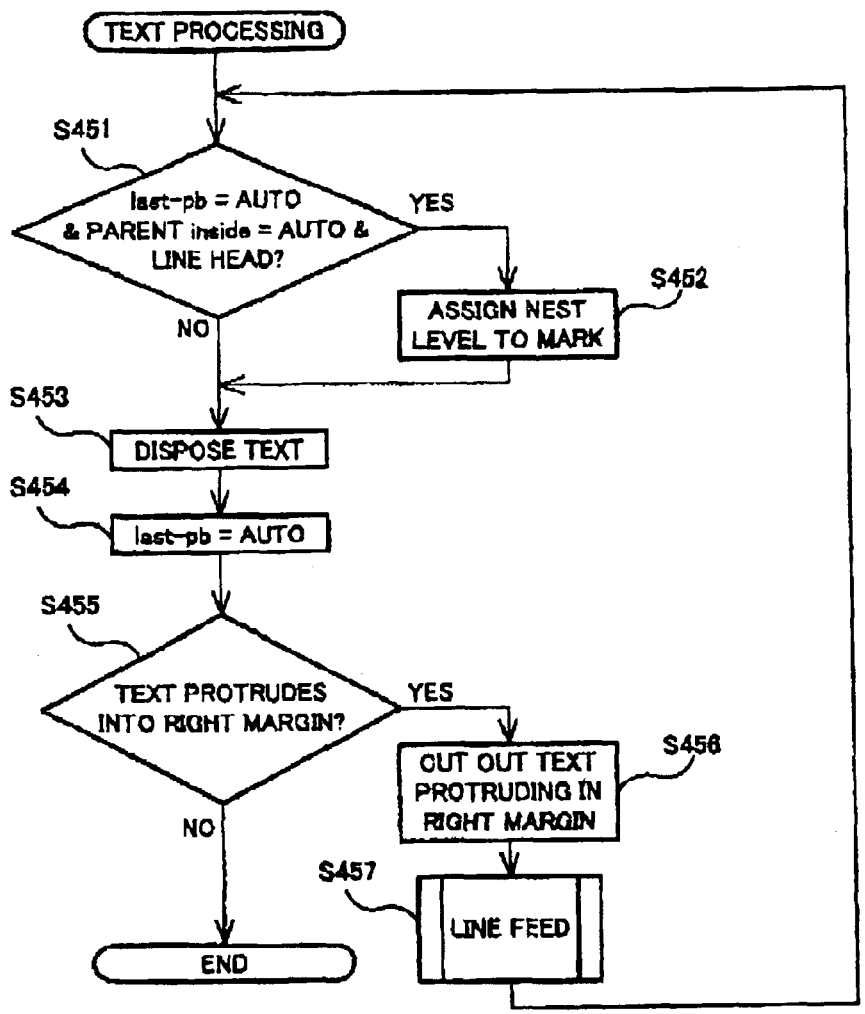
FIG. 18 is a flowchart of text processing according to the third embodiment of the present invention.

Next, text processing according to this embodiment will be described with reference to FIG. 18.

In Step 451, the CPU 11 judges whether or not all of three conditions are satisfied: (a) the page break information "last-pb" is "AUTO"; (b) a command "page-break-inside" included in data concerning block start for the upper level block is "AUTO"; and (c) the currently processing position is a line head. When the CPU 11 judged all the conditions to be satisfied, that is, YES in Step 451, the flow advances to Step 452. When the CPU 11 judged at least one of the conditions not to be satisfied, that is, NO in Step 451, the flow advances to Step 453.

Figure 20:
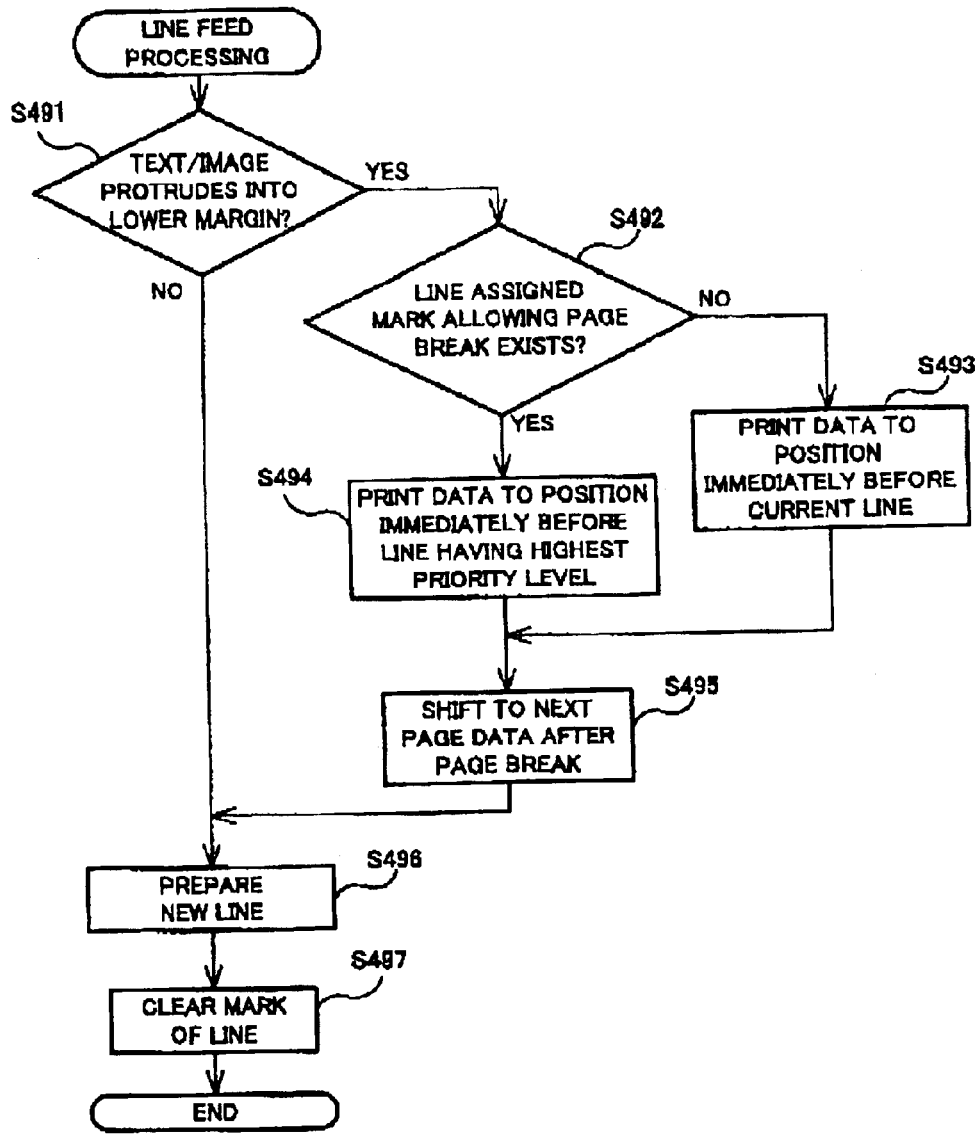
FIG. 20 is a flowchart of line feed processing according to the third embodiment of the present invention.

In step 452, the CPU 11 sets a mark having a value of nest level NL, to the line being currently processed in the target block, for example, a line newly prepared by line feed processing as will be described later (see Step 496 in FIG. 20). The flow then advances to Step 453.

In Steps 453 and 454, the CPU 11 performs substantially the same processes as in Steps 253 and 254, respectively.

In Step 455, the CPU 11 judges whether or not the letter string disposed in Step 453 protrudes beyond the right end of the disposition range into the right margin. When the CPU 11 judged the letter string to protrude into the right margin, that is, YES in Step 455, the flow advances to Step 456. When the CPU 11 judged the letter string not to protrude into the right margin, that is, NO in step 455, text processing is ended.

In step 456, the CPU 11 extracts the part of the letter string protruding in the right margin, from the letter string disposed in Step 453. Successively in Step 457, the CPU 11 performs line feed processing as will be described later with reference to FIG. 20. Thereby, the currently processing position is set to a line head. Every time when line feed processing is performed, the layout lines of the letter string disposed in one logical line increases one by one. The flow then returns to Step 451. Steps 453 and 454 are skipped in the second or later loop.

Figure 19:
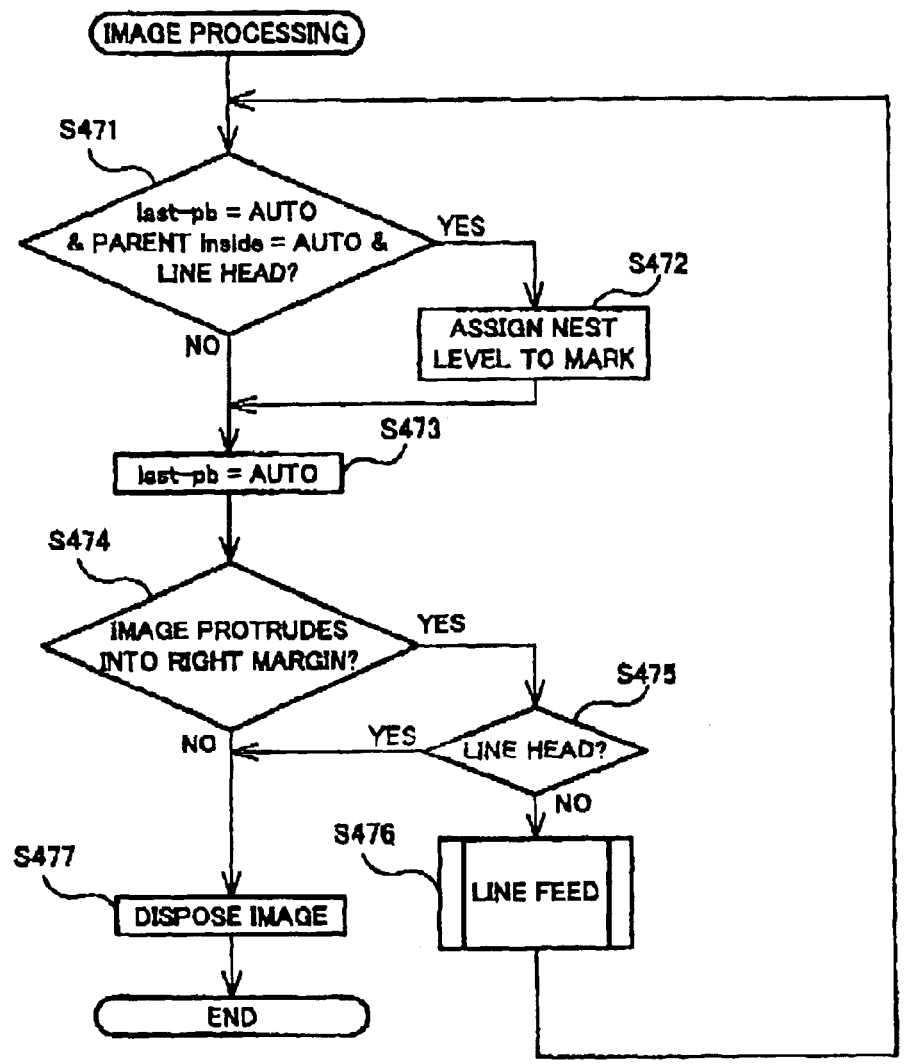
FIG. 19 is a flowchart of image processing according to the third embodiment of the present invention.

Next, image processing according to this embodiment will be described with reference to FIG. 19.

In Step 471, the CPU 11 judges whether or not all of three conditions are satisfied: (a) the page break information "last-pb" is "AUTO", (b) a command "page-break-inside" included in data concerning block start for the upper level block is "AUTO"; and (c) the currently processing position is a line head. When the CPU 11 judged all the conditions to be satisfied, that is, YES in step 471, the flow advances to Step 472. When the CPU 11 judged at least one of the conditions not to be satisfied, that is, NO in step 471, the flow advances to Step 473.

In step 472, the CPU 11 sets a mark having a value of nest level ML, to the line being currently processed in the target block, for example, a line newly prepared by line feed processing as will be described later (see Step 496 in FIG. 20). The flow then advances to Step 473.

In Step 473, the CPU 11 performs substantially the same process as in Step 273.

In Step 474, referring to the currently processing position, the CPU 11 judges whether or not the image to be disposed in Step 477 as will be described later, protrudes beyond the right end of the disposition range into the right margin. When the CPU 11 judged the image to protrude into the right margin, that is, YES in Step 474, the flow advances to Step 475. When the CPU 11 judged the image not to protrude into the right margin, that is, NO in Step 474, the flow advances to Step 477.

In Step 475, the CPU 11 judges whether or not the currently processing position is a line head. When the CPU 11 judged the processing position to be a line head, that is, YES in Step 475, the flow advances to Step 477. When the CPU 11 judged the processing position not to be a line head, that is, NO in step 475, the flow advances to step 476.

In Step 476, the CPU 11 performs line feed processing as will be described later with reference to FIG. 20. Thereby, the currently processing position is set to a line head. The flow then returns to Step 471.

In Step 477, the CPU 11 disposes one image at the currently processing position within the disposition range. Image processing is then ended.

Next, line feed processing according to this embodiment will be described with reference to FIG. 20.

In Step 491, the CPU 11 judges whether or not the text data extracted in Step 456 or the image data to be disposed in Step 477 protrudes beyond the lower end of the disposition range into the lower margin when the data is disposed with inserting a line feed immediately before the data. When the CPU 11 judged the text data or the image data to protrude in the lower margin, that is, YES in Step 491, the flow advances to step 492 because a line feed is necessary. When the CPU 11 judged the text data or the image data not to protrude in the lower margin, that is, NO in Step 491, the flow advances to Step 496.

In step 492, the CPU 11 judges whether or not a line exists to which a mark having a value of nest level NL and indicating that a page break is allowable was set. When the CPU 11 concluded that a line existed to which a mark indicating that a page break is allowable had been set, that is, YES in Step 492, the flow advances to Step 494. When the CPU 11 concluded that no line existed to which a mark indicating that a page break is allowable had been set, that is, when no page break allowable position has been found in processing till now, that is, NO in Step 492, the flow advances to Step 493.

In Step 493, the CPU 11 adopts a position immediately before the line being currently processed, as a page break position. The CPU 11 then transmits, to the printing unit 14, the text data and/or the image data having been disposed to the adopted page break position, as print data. Thereby, the printing unit 14 can print the text data and/or the image data on one page of sheet such that the text data and/or the image data immediately before the line being currently processed is vertically and horizontally within the disposition range. The flow then advances to Step 495.

In Step 494, the CPU 11 adopts a position immediately before the lowermost marked line in the page to which the mark having the lowest value of nest level NL has been set, i.e., which has the highest priority level, as a page break position. The CPU 11 then transmits, to the printing unit 14, the text data and/or the image data having been disposed to the adopted page break position, as print data. Thereby, the printing unit 14 can print the text data and/or the image data on one page of sheet is such that the text data and/or the image data immediately before the lowermost marked line in the page is vertically and horizontally within the disposition range. The flow then advances to Step 495.

In Step 495, the CPU 11 shifts, to the next page, the data not printed in Step 493 or 494.

In Step 496, the CPU 11 performs substantially the same process as in Step 297. In Step 497, the CPU 11 clears a mark set to each line prepared in Step 496, or sets another mark than the mark indicating that a page break is allowable. Line feed processing is then ended.

As described above, in this embodiment, a page break allowable position is searched for from the upper end toward the lower end of each page, using a command for inhibiting a page break, such as "page-break-before: AVOID", "page-break-inside: AVOID", and "page-break-after; AVOID". Every time when a page break allowable position is found, a mark having a value of nest level is set. When a page break is necessary, a position immediately before the lowermost marked line in the page, which has the highest priority level, is adopted as a page break position. Thus, a page break pan be inserted at a proper position. In addition, because a page break position is determined with taking account of the priority level, the upper level block is apt to be printed on the same print medium and thus the output contents is easy to see. Further, also in the third embodiment, the same advantages as in the first embodiment can be obtained.

In the present invention, a page break allowable position may be detected using page break inhibition information, e.g., "AVOID" in the above-described embodiments, and a page break position may be determined using the detection results. For example, in the second embodiment, a position immediately before the lowermost line in a page to which a mark indicating that a page break is allowable has been set, is adopted as a page break position. However, a position immediately before one of marked lines may be adopted as a page break position. Further, in the third embodiment, a position immediately before the lowermost line in a page, having the highest priority level, i.e., having the lowest nest level, is adopted as a page break position. However, a position immediately before one of lines each having the highest priority level may be adopted as a page break position.

Further, information other than that according to the standard of CSS may be used as page break inhibition information. Further, letters or characters may be arranged not in horizontal lines but in vertical lines. Further, not a client computer prepares interface data but the client computer may transmit an HTML file and a CSS file to a printer so that the printer can prepare interface data.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A print control apparatus comprising:
   a disposing unit for disposing, on pages, document data described in a page description language;
   a page break allowable position detecting unit for detecting a page break allowable position in the document data;
   a disposition range determining unit for determining a disposition range in each page for the document data to be disposed by the disposing unit;
   a page break allowable position storage unit for storing the page break allowable position detected by the page break allowable position detecting unit;
   a disposition range storage unit for storing the disposition range in each page; and
   a page break position determining unit for determining a page break position in the document data on the basis of the page break allowable position stored in the page break allowable position storage unit and the disposition range in each page stored in the disposition range storage unit, such that part of the document data to be disposed in each page does not overflow the page, wherein the page break allowable position detecting unit considers information related to the document data that is used to inhibit a page break.

2. The apparatus according to claim 1, wherein the apparatus further comprises a page break allowable position update unit for updating the page break allowable position stored in the page break allowable position storage unit, into a new page break allowable position nearer to an end of the corresponding page than the page break allowable position having stored in the page break allowable position storage unit, detected by the page break allowable position detecting unit that is searching page break allowable positions in order from the head of the document data, and
   the page break position determining unit adopts, as a page break position in the document data, the page break allowable position stored in the page break allowable position storage unit when the page break allowable position detecting unit completes the search of page break allowable positions corresponding to the disposition range in each page stored in the disposition range storage unit.

3. The apparatus according to claim 1, wherein the page break position determining unit adopts, as a page break position in the document data, the page break allowable position nearest to an end of each page, stored in the page break allowable position storage unit storing a plurality of page break allowable positions in the page.

4. The apparatus according to claim 1, wherein the apparatus further comprises a priority level assigning unit for assigning a priority level to each page break allowable position detected by the page break allowable position detecting unit, and
   the page break position determining unit determines a page break position in each page by selecting one out of a plurality of page break allowable positions in the page stored in the page break allowable position storage unit, on the basis of the priority level given by the priority level assigning unit.

5. The apparatus according to claim 1, wherein the page break position determining unit adopts, as a page break position in the document data, an end of a disposition range stored in the disposition range storage unit or a position immediately before the end of the disposition range if the page break allowable position storage unit stores no page break allowable position when the page break allowable position detecting unit searching page break allowable positions in order from the head of the document data completes the search of page break allowable positions corresponding to the disposition range stored in the disposition range storage unit.

6. The apparatus according to claim 1, wherein the document data comprises a letter string including one or more lines in each of which letters are arranged in a horizontal direction, and the disposing unit disposes the letter string within a horizontal disposition range, which defines both horizontal ends of each line, such that a protrusion of the letter string beyond the horizontal disposition range is disposed in the next line.

7. The apparatus according to claim 6, wherein the page break position determining unit determines a page break position in the document data with taking account of the disposing unit disposing a protrusion of the letter string beyond the horizontal disposition range in the next line.

8. The apparatus according to claim 1, wherein the document data including one or more blocks, and the information that is used to inhibit a page break inhibits a page break before, after, or inside each block.

9. A print control method comprising the steps of:

disposing, on pages, document data described in a page description language;

detecting a page break allowable position in the document data;

storing the page break allowable position detected in the step of detecting the page break allowable position; and determining a page break position in the document data on the basis of the page break allowable position stored in the step of storing the page break allowable position and a disposition range in each page for the document data to be disposed in the step of disposing the document data, such that part of the document data to be disposed in each page does not overflow the page, wherein the page break allowable position is detected based on information related to the document data that is used to inhibit a page break.

10. A computer program product comprising:

a document data disposing program for disposing, on pages, document data described in a page description language;

a page break allowable position detecting program for detecting a page break allowable position in the document data;

a page break allowable position storing program for storing, in a memory, the page break allowable position detected by the page break allowable position detecting program; and a page break position determining program for determining a page break position in the document data on the basis of the page break allowable position stored in the memory by the page break allowable position storing program and a disposition range in each page for the document data, such that part of the document data to be disposed in each page does not overflow the page, wherein the page break allowable position detecting program considers information related to the document data that is used to inhibit a page break.

11. A printer comprising:

a document data disposing unit for disposing, on pages, document data described in a page description language;

a page break allowable position detecting unit for detecting a page break allowable position in the document data;

a disposition range determining unit for determining a disposition range in each page for the document data to be disposed by the disposing unit;

a page break allowable position storage unit for storing the page break allowable position detected by the page break allowable position detecting unit;

a disposition range storage unit for storing the disposition range in each page;

a page break position determining unit for determining a page break position in the document data on the basis of the page break allowable position stored in the page break allowable position storage unit and the disposition range in each page stored in the disposition range storage unit, such that part of the document data to be disposed in each page does not overflow the page; and a printing unit for printing with inserting a page break in the document data on the basis of the page break position determined by the page break position determining unit, wherein the page break allowable position detecting unit considers information related to the document data that is used to inhibit a page break.

* * * * *